(12) United States Patent
Szekely

(10) Patent No.: US 10,358,774 B2
(45) Date of Patent: Jul. 23, 2019

(54) SECURELY INTERCONNECTABLE MODULES FOR USE IN CONSTRUCTING A PATHWAY FOR TRAFFIC

(71) Applicant: Kenneth Szekely, Oakville (CA)

(72) Inventor: Kenneth Szekely, Oakville (CA)

(73) Assignee: ASTRA CAPITAL INCORPORATED, Mississauga (CA)

( * ) Notice: Subject to any disclaimer, the term of this patent is extended or adjusted under 35 U.S.C. 154(b) by 296 days.

(21) Appl. No.: 14/955,214

(22) Filed: Dec. 1, 2015

(65) Prior Publication Data

US 2019/0024322 A1     Jan. 24, 2019

Related U.S. Application Data

(60) Provisional application No. 62/086,707, filed on Dec. 2, 2014.

(51) Int. Cl.
| | |
|---|---|
| *E01C 5/00* | (2006.01) |
| *E01C 15/00* | (2006.01) |
| *E01C 11/00* | (2006.01) |
| *F24D 13/02* | (2006.01) |
| *H05B 3/28* | (2006.01) |

(Continued)

(52) U.S. Cl.
CPC ............... *E01C 5/005* (2013.01); *B32B 3/06* (2013.01); *B32B 5/02* (2013.01); *B32B 7/12* (2013.01); *E01C 5/00* (2013.01); *E01C 5/20* (2013.01); *E01C 5/22* (2013.01); *E01C 11/00* (2013.01); *E01C 11/245* (2013.01); *E01C 11/26* (2013.01); *E01C 11/265* (2013.01); *E01C 15/00* (2013.01); *F16B 5/0012* (2013.01); *F24D 13/02* (2013.01); *H05B 3/26* (2013.01); *H05B 3/28* (2013.01); *H05B 3/32* (2013.01); *B32B 2255/26* (2013.01); *B32B 2262/101* (2013.01); *B32B 2307/302* (2013.01); *E01C 5/003* (2013.01); *E01C 2201/02* (2013.01); *E01C 2201/14* (2013.01);

(Continued)

(58) Field of Classification Search
CPC . E01C 5/003; E01C 5/005; E01C 5/20; E01C 11/245; E01C 11/265; E01C 15/00; F16B 5/0012
USPC ..................................................... 404/34–54
See application file for complete search history.

(56) References Cited

U.S. PATENT DOCUMENTS 2,138,217 A    11/1938 Sutter
2,315,180 A *  3/1943 Arthur .................... E01C 9/083
                                                          160/220

(Continued)

*Primary Examiner* — Raymond W Addie
(74) *Attorney, Agent, or Firm* — Hodgson Russ LLP

(57) ABSTRACT

A module for use in constructing a pathway for traffic comprises a base member that defines a lateral groove disposed at its perimeter edge and extending along a first end, and a tongue structure disposed at its perimeter edge and extending along a second end. The tongue structure is received in the lateral groove and comprises a plurality of tongue portions that includes a first type of tongue portion and a second type of tongue portion disposed in alternating relation along the length of the tongue structure, to thereby define a throughpassage for receiving a securing rod. The first and second tongue portions have no vertical overlap one with the other. To form a pathway for traffic, the modules are placed in perimeter-edge to perimeter-edge relation, with the tongue structure of the modules inserted into the lateral groove of an adjacent module, and are secured together by the securing rod.

30 Claims, 19 Drawing Sheets

(51) Int. Cl.

| | |
|---|---|
| *H05B 3/26* | (2006.01) |
| *E01C 5/22* | (2006.01) |
| *E01C 11/26* | (2006.01) |
| *B32B 3/06* | (2006.01) |
| *B32B 5/02* | (2006.01) |
| *B32B 7/12* | (2006.01) |
| *H05B 3/32* | (2006.01) |
| *E01C 5/20* | (2006.01) |
| *E01C 11/24* | (2006.01) |
| *F16B 5/00* | (2006.01) |

(52) U.S. Cl.
CPC .... *E01C 2201/16* (2013.01); *H05B 2203/026* (2013.01); *Y02B 30/26* (2013.01)

(56) References Cited

U.S. PATENT DOCUMENTS

| | | | |
|---|---|---|---|
| 3,236,991 A | 2/1966 | Graham et al. | |
| 5,275,502 A * | 1/1994 | Glaza | E01C 19/522 404/35 |
| 5,616,389 A * | 4/1997 | Blatz | A47G 27/0293 404/36 |
| 6,558,070 B1 * | 5/2003 | Valtanen | E01C 5/22 404/35 |
| 6,588,160 B1 * | 7/2003 | Grossman | E01D 19/125 14/73 |
| 6,614,992 B2 | 9/2003 | Schmitt | |
| 6,715,956 B1 | 4/2004 | Weber et al. | |
| 7,344,334 B2 | 3/2008 | Thorkelson | |
| 7,610,731 B1 * | 11/2009 | Collison | E04F 15/043 52/591.3 |
| 8,288,652 B2 * | 10/2012 | Lubanski | H02G 9/025 104/275 |
| 8,550,744 B1 | 10/2013 | Lee | |
| 9,353,487 B1 | 5/2016 | Szekely | |
| 10,036,559 B2 | 7/2018 | Szekely | |
| 2011/0002735 A1 * | 1/2011 | Lynn | B60B 39/12 404/35 |
| 2013/0119043 A1 | 5/2013 | Consiglio | |
| 2015/0034067 A1 | 2/2015 | Szekely | |
| 2015/0282247 A1 | 10/2015 | Batchu | |
| 2016/0153669 A1 | 6/2016 | Szekely | |
| 2017/0191228 A1 | 7/2017 | Dong | |
| 2017/0211241 A1 | 7/2017 | Calinescu et al. | |

* cited by examiner

SECURELY INTERCONNECTABLE MODULES FOR USE IN CONSTRUCTING A PATHWAY FOR TRAFFIC

RELATED APPLICATIONS

This application is a non-provisional application claiming priority from U.S. Provisional Patent Application Ser. No. 62/086,707 filed on Dec. 2, 2014, which is herein incorporated by reference.

FIELD OF THE INVENTION

The present invention relates to modules for use in constructing pathways such as pedestrian walkways and driveways for vehicles, and more particularly to modules for use in constructing such pathways wherein the modules can be heated and can include detectable warning indicators at the top surface thereof.

BACKGROUND OF THE INVENTION

In areas where there is pedestrian and vehicular traffic, particularly in publically accessible areas, it is universally common to have specific pathways, such as walkways for pedestrians and driveways for vehicles.

Such walkways might include sidewalks, pedestrian bridges, paved walkways through parks, patios, floor surfaces, and the like. Further, such pedestrian walkways exist in public transit facilities, such as subway stations, light rapid transit, bus rapid transit, railway stations, and the like, where there is very significant amount of pedestrian traffic. In many types of pedestrian walkways, there is a requirement for pedestrians to be able to safely navigate such walkways and to remain on the walkways, especially where public transit vehicles are passing closely by. This is particularly important for mass transit platforms in public transit facilities, where there is presently the most significant need for safe pedestrian walkways, such as mass transit platforms and the like.

More specifically, there is a need for pedestrians to be able to maintain good traction on pedestrian walkways in order to prevent slips and falls, particularly on outdoor surfaces that can be subject to inclement weather such as wind, rain and snow, and on outdoor surfaces that retain snow and ice.

Additionally, in some places such as public transit facilities, driveways and the like for vehicles, particularly service vehicles, there is a need to be able to maintain good traction for vehicles during inclement weather and on outdoor surfaces that retain snow and ice. Additionally, it is important for pedestrians to be able to determine the nearby presence of platform edges so that the pedestrians do not accidentally walk off the edge of a platform, where a vehicle, such as a public transit vehicle, or even a private vehicle, might be passing by. This is especially important in mass transit situations, and particularly for commuter trains, where the side of the train is right at the edge of the platform. The need for making the nearby presence of platform edges easy to determine, especially by blind or visually impaired persons, is of course is of particularly acute importance in attempting to make such facilities accessible and safe for blind or visually impaired persons.

Various types of transit boarding platform panels exist that include detectable warning tiles at the top thereof in order to permit persons, especially blind or visually impaired persons, to detect the nearby presence of platform edges. One such state-of-the art transit boarding platform panels is taught in the present inventor's earlier U.S. Pat. No. 7,690,862, issued Apr. 6, 2010 to Szekely, and entitled Quick Connect Transit Boarding Platform Panel. The transit boarding platform panel is for use along an edge of a transit platform adjacent a track. The panel comprises a molded base portion formed from a reinforced composite polymer. The base portion has a top deck and bottom plate, a first side and an opposite second side, a first end and an opposite second end. The first side is intended to be adjacent a track at an edge of the transit boarding platform. The second side is intended to be adjacent the transit platform. A series of internal support members are disposed between the top deck and bottom plate. In one embodiment, the top deck has a detectable warning surface consisting of raised truncated domes detectable by the visually impaired in accordance with Americans with Disabilities Act (ADA): Accessibility Guidelines for Buildings and Facilities. The first and second ends are provided with means to interconnect adjacent panels and to secure the panels to the platform. In a preferred embodiment the means to interconnect adjacent panels and to secure the panels to the platform includes a groove provided on the first end of each panel and a tongue provided on the second end of each panel. The groove is sized and shaped to accept a corresponding sized and shaped tongue provided on the second end of an adjacent panel. The tongue is hollow and has a bolt hole at either end. A threaded securing rod is inserted through a hole in the timber headers that form the retaining wall for the platform, and then is inserted through the tongue via the bolt holes.

This transit boarding platform panel is installed by 1) Setting a sub-base of engineered granular fill (crushed stone); 2) Laying out timber retaining wall and stake in platform, 3) Filling in retaining wall area with compacted granular fill; and 4) Installing structural plastic transit platform.

While it has been found that this transit boarding platform panel works very well, it has also been found that there is a need for modules for constructing pathways, such as pedestrian walkways and vehicular driveways, including mass transit platforms, wherein the modules are readily installable, are cost effective to install, are readily removable and replaceable, are readily connectable one to the next, are readily securable one to the next, are readily connectable one to the next on a substrate surface of a non-constant grade, are readily securable one to the next on a substrate surface of a non-constant grade, are readily connectable one to the next so as to accommodate varying angles of end-to-end connections between modules, are readily securable one to the next so as to accommodate varying angles of end-to-end connections between modules, wherein the modules readily fit properly in place adjacent a wood header of an adjoining platform subgrade that accommodates modules that are about three inches in height, wherein the modules include detectable warning indicators, wherein the modules include textured top surface, wherein the modules are water-resistant, wherein the modules are lightweight, wherein the amount of material used to form the modules is significantly less than in the prior art, wherein the amount of material used to form the internal support members of the modules is significantly less than in the prior art, wherein the modules are easier to manufacture than are prior art modules, wherein the modules are quicker to manufacture than are prior art modules, wherein the base member of the modules can be made via a compression molding process or method, such as sheet molded compound (SMC) or wet compression molding.

Other relevant prior art documents include the following.

U.S. Pat. No. 8,601,758 issued Dec. 10, 2013, to Biadora and entitled Interlocking Construction Blocks, discloses interlocking construction blocks having a tongue and groove configuration, attachable together by pressing the tongue of one block into a groove of another block. Multiple blocks may be adapted to be interlocked together forming a structure, such as a wall. Blocks comprise first and second opposing sidewalls integrally connected together by first and second pairs of opposing connecting walls. The first and second sidewalls comprise a lower portion integrally connected to an upper portion. The lower portion comprises a pair of opposing lower portion sidewalls integrally connected to a pair of opposing lower end walls. The upper portion comprises a planar top surface, a pair of opposing upper portion sidewalls and a pair of opposing upper portion end walls integrally connected via upper portion angular walls. The upper portion sidewalls, upper portion end walls and upper angular walls may have a beveled or tapered surface.

U.S. Pat. No. 8,407,951 issued Apr. 2, 2013, to Haney et al, and entitled Modular Synthetic Floor Tile Configured For Enhanced Performance, discloses a modular synthetic floor tile comprising an upper contact surface, and a plurality of openings formed in the upper contact surface. Each of the openings has a geometry defined by structural members configured to intersect with one another at various intersection points to form at least one acute angle as measured between imaginary axes extending through the intersection points. The structural members have a smooth, planar top surface forming the contact surface, and a face oriented transverse to the top surface. A transition surface extends between the top surface and the face of the structural members configured to provide a blunt edge between the top surface and the face, and to reduce abrasiveness of the floor tile. The means for coupling the floor tile to at least one other floor tile comprises a plurality of coupling elements in the form of loop and pin connectors disposed along the perimeter wall, with loop connectors disposed on two contiguous sides, and pin connectors disposed on opposing contiguous sides. The loop and pin connectors are configured to allow interconnection of the floor tile with similar adjacent floor tiles to form a flooring system, in a manner that is well known in the art.

U.S. Pat. No. 7,993,731 issued Aug. 9, 2011, to Miller et al, and entitled Hard Surface-Veneer Engineered Surfacing Tiles, discloses a modular tile assembly having a substantially rigid substrate, at least one sealant layer, and at least one stone, ceramic, or porcelain tile. A bottom surface of a first sealant layer is bonded to an upper surface of the substrate and a top surface of a second sealant layer is bonded to a lower surface of the substrate. The tile is bonded to at least a portion of the top surface of the first sealant layer. In one example, the substrate is provided with a tongue or a groove defined in any one, combination, or each of the respective side edges of the substrate.

U.S. Pat. No. 7,900,416 issued Mar. 8, 2011, to Yokubison et al, and entitled Floor Tile With Load Bearing Lattice, discloses a floor tile for use in a flooring system. The floor tile comprises an upper surface operable for use as a portion of a flooring installation and a support lattice operable to support the upper surface. The support lattice includes a plurality of support members extending downwardly from an underside of the upper surface and terminating in lower sections collectively defining a subfloor contact profile and a plurality of interconnecting members laterally interconnecting two or more of the support members. At least some of the plurality of support members extend downwardly at an oblique angle to the upper surface. A protruding connecting member is disposed at a lateral edge of the floor tiles. A gutter connecting member is disposed at opposite lateral edge of the floor tile. The protruding connecting member and the gutter connecting member are operable to provide substantially liquid-tight lateral edge connection of adjacent floor tiles.

It is an object of the present invention to provide modules, such as modular panels and modular tiles, and the like, for use in constructing pathways, such as pedestrian walkways and vehicular driveways.

It is an object of the present invention to provide modules, such as modular panels and modular tiles, and the like, for use in constructing pathways, such as pedestrian walkways, particularly a transit platform or the like.

It is an object of the present invention to provide modules, such as modular panels and modular tiles, and the like, for use in constructing pathways, such as pedestrian walkways and vehicular driveways, wherein the modules are readily installable.

It is an object of the present invention to provide modules, such as modular panels and modular tiles, and the like, for use in constructing pathways, such as pedestrian walkways and vehicular driveways, wherein the modules are cost effective to install.

It is an object of the present invention to provide modules, such as modular panels and modular tiles, and the like, for use in constructing pathways, such as pedestrian walkways and vehicular driveways, wherein the top panels are readily removable and replaceable.

It is a further object of the present invention to provide modules, such as modular panels and modular tiles, and the like, for use in constructing pathways, such as pedestrian walkways and vehicular driveways, wherein the modules are readily connectable one to the next.

It is a further object of the present invention to provide modules, such as modular panels and modular tiles, and the like, for use in constructing pathways, such as pedestrian walkways and vehicular driveways, wherein the modules are readily securable one to the next.

It is a further object of the present invention to provide modules, such as modular panels and modular tiles, and the like, for use in constructing pathways, such as pedestrian walkways and vehicular driveways, wherein the modules are readily connectable one to the next on a substrate surface of a non-constant grade.

It is a further object of the present invention to provide modules, such as modular panels and modular tiles, and the like, for use in constructing pathways, such as pedestrian walkways and vehicular driveways, wherein the modules are readily securable one to the next on a substrate surface of a non-constant grade.

It is a further object of the present invention to provide modules, such as modular panels and modular tiles, and the like, for use in constructing pathways, such as pedestrian walkways and vehicular driveways, wherein the modules are readily connectable one to the next so as to accommodate varying angles of end-to-end connections between modules.

It is a further object of the present invention to provide modules, such as modular panels and modular tiles, and the like, for use in constructing pathways, such as pedestrian walkways and vehicular driveways, wherein the modules are readily securable one to the next so as to accommodate varying angles of end-to-end connections between modules.

It is another object of the present invention to provide modules, such as modular panels and modular tiles, and the like, for use in constructing pathways, such as pedestrian walkways and vehicular driveways, wherein the modules readily fit properly in place adjacent a wood header of an adjoining platform subgrade that accommodates modules that are about three inches in height.

It is another object of the present invention to provide modules, such as modular panels and modular tiles, and the like, for use in constructing pathways, such as pedestrian walkways and vehicular driveways, wherein the modules include detectable warning indicators.

It is another object of the present invention to provide modules, such as modular panels and modular tiles, and the like, for use in constructing pathways, such as pedestrian walkways and vehicular driveways, wherein the modules include textured top surface.

It is a further object of the present invention to provide modules, such as modular panels and modular tiles, and the like, for use in constructing pathways, such as pedestrian walkways and vehicular driveways, wherein the modules are water-resistant.

It is a further object of the present invention to provide modules, such as modular panels and modular tiles, and the like, for use in constructing pathways, such as pedestrian walkways and vehicular driveways, wherein the modules are lightweight.

It is a further object of the present invention to provide modules, such as modular panels and modular tiles, and the like, for use in constructing pathways, such as pedestrian walkways and vehicular driveways, wherein the amount of material used to form the modules is significantly less than in the prior art.

It is a further object of the present invention to provide modules, such as modular panels and modular tiles, and the like, for use in constructing pathways, such as pedestrian walkways and vehicular driveways, wherein the amount of material used to form the internal support members of the modules is significantly less than in the prior art.

It is a further object of the present invention to provide modules, such as modular panels and modular tiles, and the like, for use in constructing pathways, such as pedestrian walkways and vehicular driveways, wherein the modules are easier to manufacture than are prior art modules.

It is a further object of the present invention to provide modules, such as modular panels and modular tiles, and the like, for use in constructing pathways, such as pedestrian walkways and vehicular driveways, wherein the modules are quicker to manufacture than are prior art modules.

It is a further object of the present invention to provide modules, such as modular panels and modular tiles, and the like, for use in constructing pathways, such as pedestrian walkways and vehicular driveways, wherein the base member of the modules can be made via a compression molding process or method, such as sheet molded compound (SMC) or wet compression molding.

SUMMARY OF THE INVENTION

In accordance with one aspect of the present invention there is disclosed a novel module for use in constructing a pathway for traffic. The module comprises a base member having a first end, a second end, a first side and a second side, a perimeter edge and a top surface. The base member defines a lateral groove disposed at the perimeter edge and extending along the first end, and a tongue structure disposed at the perimeter edge and extending along the second end. The tongue structure is shaped and dimensioned to be received in the lateral groove. The tongue structure comprises a plurality of tongue portions, and includes a first type of tongue portion and a second type of tongue portion disposed in alternating relation along the length of the tongue structure, to thereby define a throughpassage for receiving a securing rod therethrough. Along the length of the tongue structure, the first and second tongue portions have no vertical overlap one with the other. To form a pathway for traffic, the modules are placed in perimeter-edge to perimeter-edge relation one to the next, with the tongue structure of the modules inserted into the lateral groove of an adjacent module, and are secured together by the securing rod.

In accordance with another aspect of the present invention there is disclosed a novel modular structure for use in constructing a pathway for traffic. The modular structure comprises a first module and a second module. Each module comprises a base member having a first end, a second end, a first side and a second side, a perimeter edge and a top surface. The base member defines a lateral groove disposed at the perimeter edge and extending along the first end, and a tongue structure disposed at the perimeter edge and extending along the second end. The tongue structure is shaped and dimensioned to be received in the lateral groove. The tongue structure comprises a plurality of tongue portions, and includes a first type of tongue portion and a second type of tongue portion disposed in alternating relation along the length of the tongue structure, to thereby define a throughpassage for receiving a securing rod therethrough. Along the length of the tongue structure the first and second tongue portions have no vertical overlap one with the other. To form a pathway for traffic, the modules are placed in perimeter-edge to perimeter-edge relation one to the next, with the tongue structure of the modules inserted into the lateral groove of an adjacent module. Also, a plurality of threaded securing rods, each threaded securing rod inserted through aligned pairs of the bore holes in the first header wall and a second header wall, respectively, and through the aligned throughpassages of side-by-side ones of the modules.

In accordance with another aspect of the present invention there is disclosed a novel pathway for traffic comprising a first header wall and a second header wall disposed in parallel spaced relation one to the other, and with aligned bore holes in the first header wall and the second header wall. There is a plurality of modules, with each module having a base member, with each the base member having a first end, a second end, a first side and a second side, a perimeter edge and a top surface. The base member defines a lateral groove disposed at the perimeter edge and extending along the first end, and a tongue structure disposed at the perimeter edge and extending along the second end. The tongue structure is shaped and dimensioned to be received in the lateral groove. The tongue structure comprises a plurality of tongue portions, and includes a first type of tongue portion and a second type of tongue portion disposed in alternating relation along the length of the tongue structure, to thereby define a throughpassage for receiving a securing rod therethrough. Along the length of the tongue structure the first and second tongue portions have no vertical overlap one with the other. To form a pathway for traffic, the modules are placed in perimeter-edge to perimeter-edge relation one to the next, with the tongue structure of the modules inserted into the lateral groove of an adjacent module. There is also a plurality of threaded securing rods, with each threaded securing rod inserted through aligned pairs of the bore holes in the first header wall and a second header wall, respectively, and through the aligned throughpassages of side-by-side ones of the modules.

In accordance with another aspect of the present invention there is disclosed a novel pathway for traffic comprising a first header wall and a second header wall disposed in parallel spaced relation one to the other, and with aligned bore holes in the first header wall and the second header wall. There is a plurality of modules, with each module having a base member, with each the base member having a first end, a second end, a first side and a second side, a perimeter edge and a top surface. The base member defines a lateral groove disposed at the perimeter edge and extending along the first end, and a tongue structure disposed at the perimeter edge and extending along the second end. The tongue structure of the first module is shaped and dimensioned to be received in the lateral groove of the second module. The tongue structure of the first module is shaped and dimensioned to be received in the lateral groove of the second module. The tongue structure comprises a plurality of tongue portions, and includes a first type of tongue portion and a second type of tongue portion disposed in alternating relation along the length of the tongue structure, to thereby define a throughpassage for receiving a securing rod therethrough. Along the length of the tongue structure the first and second tongue portions have no vertical overlap one with the other. To form a pathway for traffic, the modules are placed in perimeter-edge to perimeter-edge relation one to the next, with the tongue structure of the modules inserted into the lateral groove of an adjacent module. There is also a plurality of threaded securing rods, with each threaded securing rod inserted through aligned pairs of the bore holes in the first header wall and a second header wall, respectively, and through the aligned throughpassages of side-by-side ones of the modules.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the module and pathway for traffic according to the present invention, as to its structure, organization, use and method of operation, together with further objectives and advantages thereof, will be better understood from the following drawings in which a presently known embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE ILLUSTRATED EMBODIMENT

Figure 1:
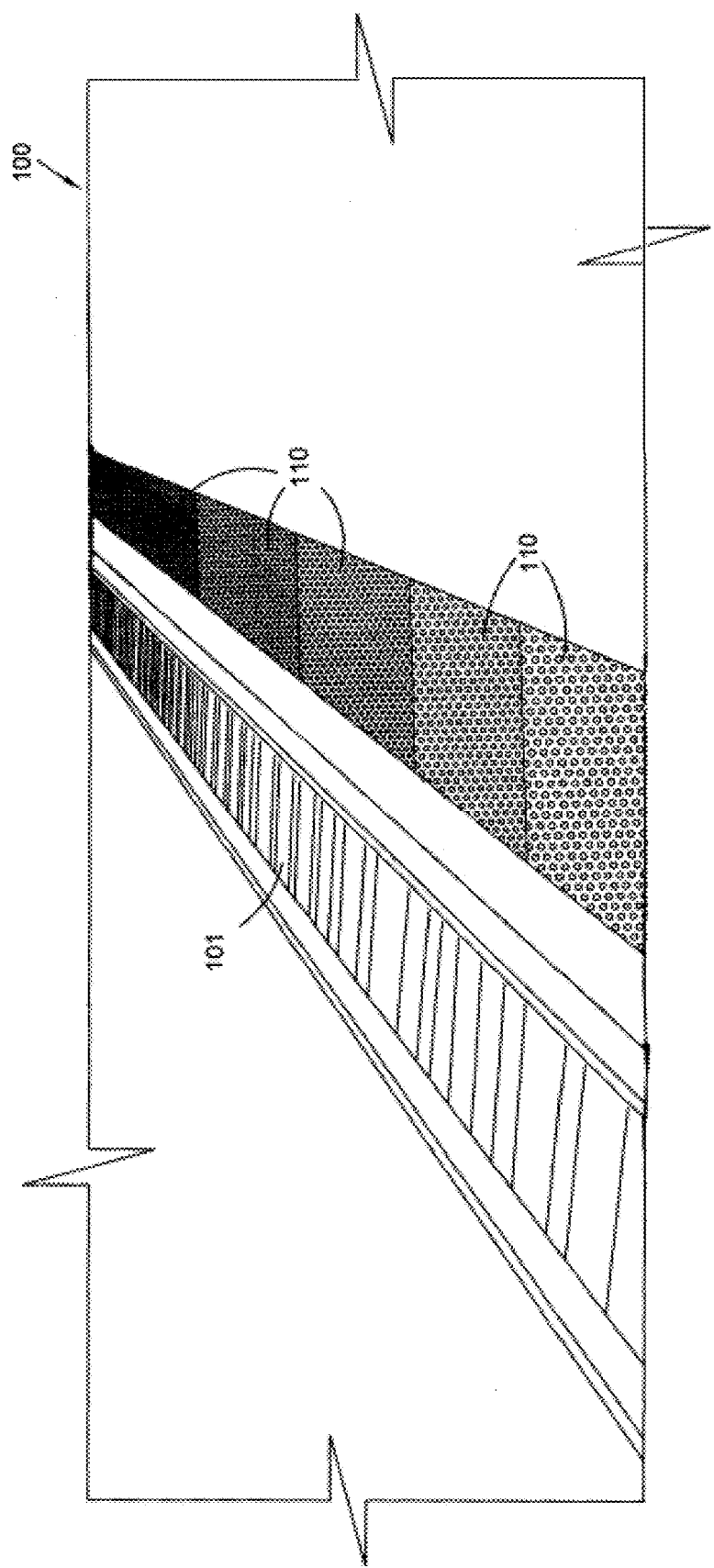
FIG. 1 is a perspective view of a plurality of the illustrated embodiment modules installed in place to form a pathway for traffic, specifically a transit platform, according to the present invention.
Figure 2:
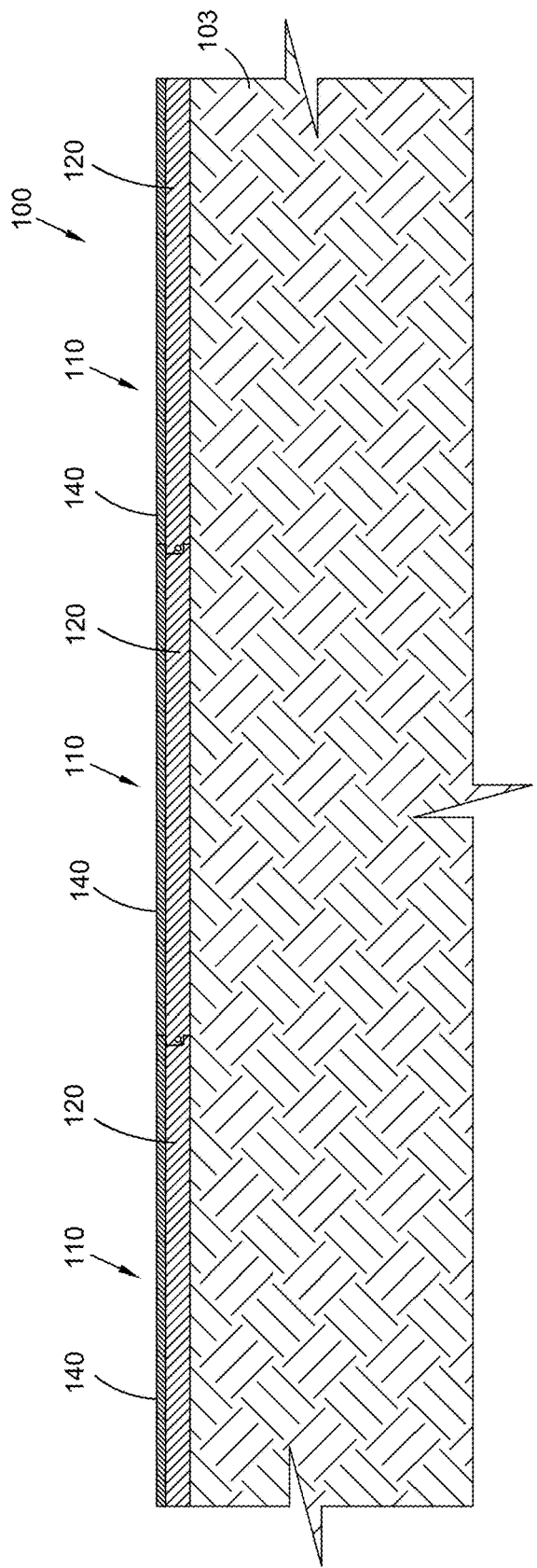
FIG. 2 is a cross-sectional side elevational view of the transit platform of FIG. 1.

Referring to FIGS. 1 through 20 of the drawings, it will be noted that FIGS. 1 through 20 show an illustrated embodiment of the module for use in constructing a pathway for traffic according to the present invention, and as indicated by the general reference numeral 100.

Reference will now be made to FIGS. 1 through 20, which show an illustrated embodiment of the module according to the present invention, as indicated by the general reference numeral 110. The illustrated embodiment of the present invention comprises a module 110, and more specifically a heatable module 110. The modules 110 are for use in constructing a pathway for traffic 100, such as a pedestrian walkway, and particularly a transit platform 100, adjacent a railroad track 101, as illustrated.

It should be noted that the module 110 might be any one or more of a panel, a tile, a platform, a platform portion, a deck, a deck portion, a plate, a block, a board, a slat, flooring, a brick, a slab, and the like.

As illustrated, the module 110 comprises, in brief, a base member 120 defining a lateral groove 108 and a tongue structure 180 shaped and dimensioned to be received in the lateral groove 108. More specifically, the tongue structure 180 of a first module is shaped and dimensioned to be received in the lateral groove 108 of a second module. The tongue structure 180 comprises a first type of tongue portion 181 and a second type of tongue portion 182. The module 110 is for use in constructing a pedestrian walkway, as indicated by the general reference numeral 100, such as a transit platform 100, adjacent a railroad track 101.

Figure 3:
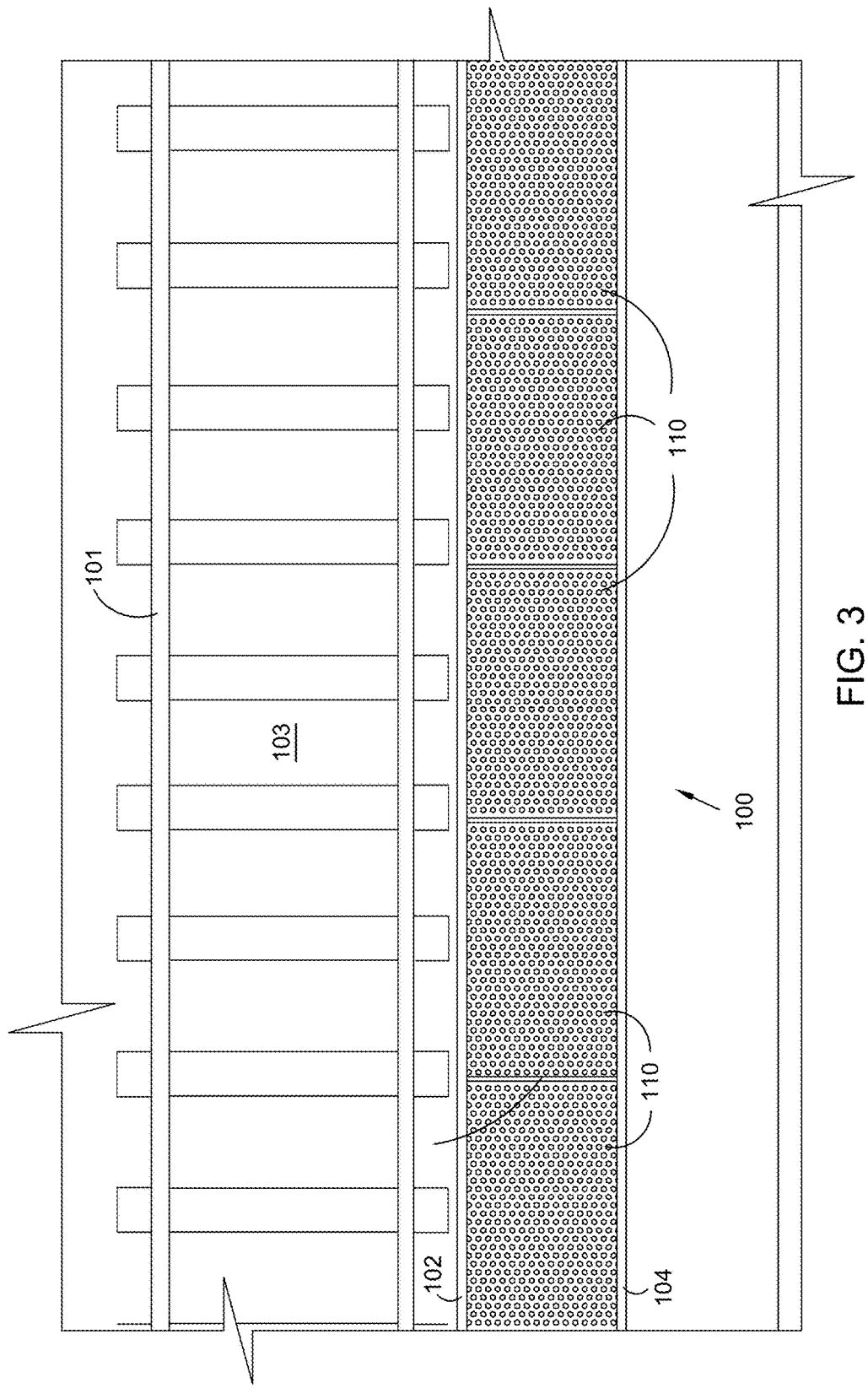
FIG. 3 is a top plan view of the transit platform of FIG. 1.
Figure 3A:
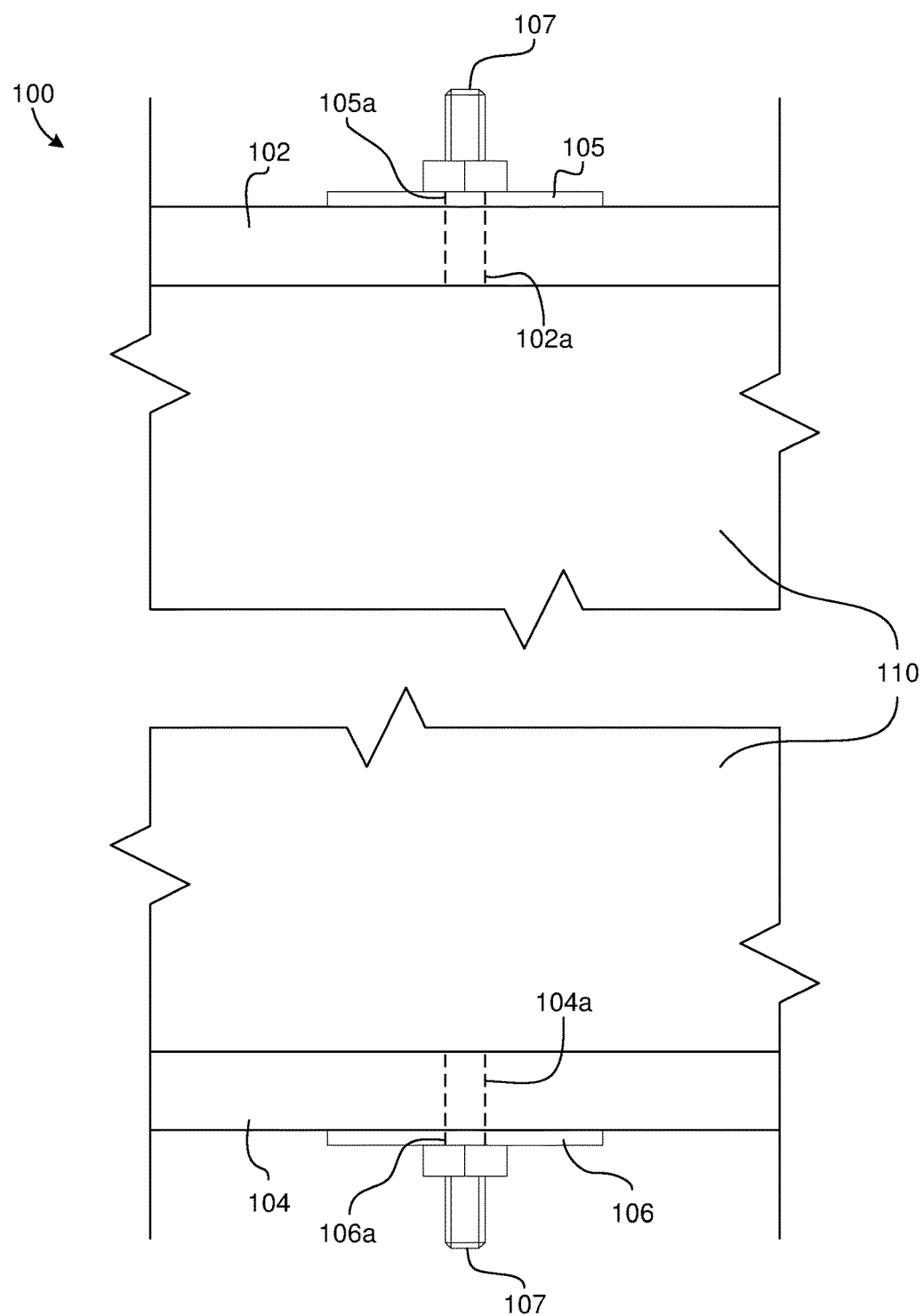
FIG. 3A is an enlarged top plan view of a portion of the transit platform of FIG. 1.
Figure 4:
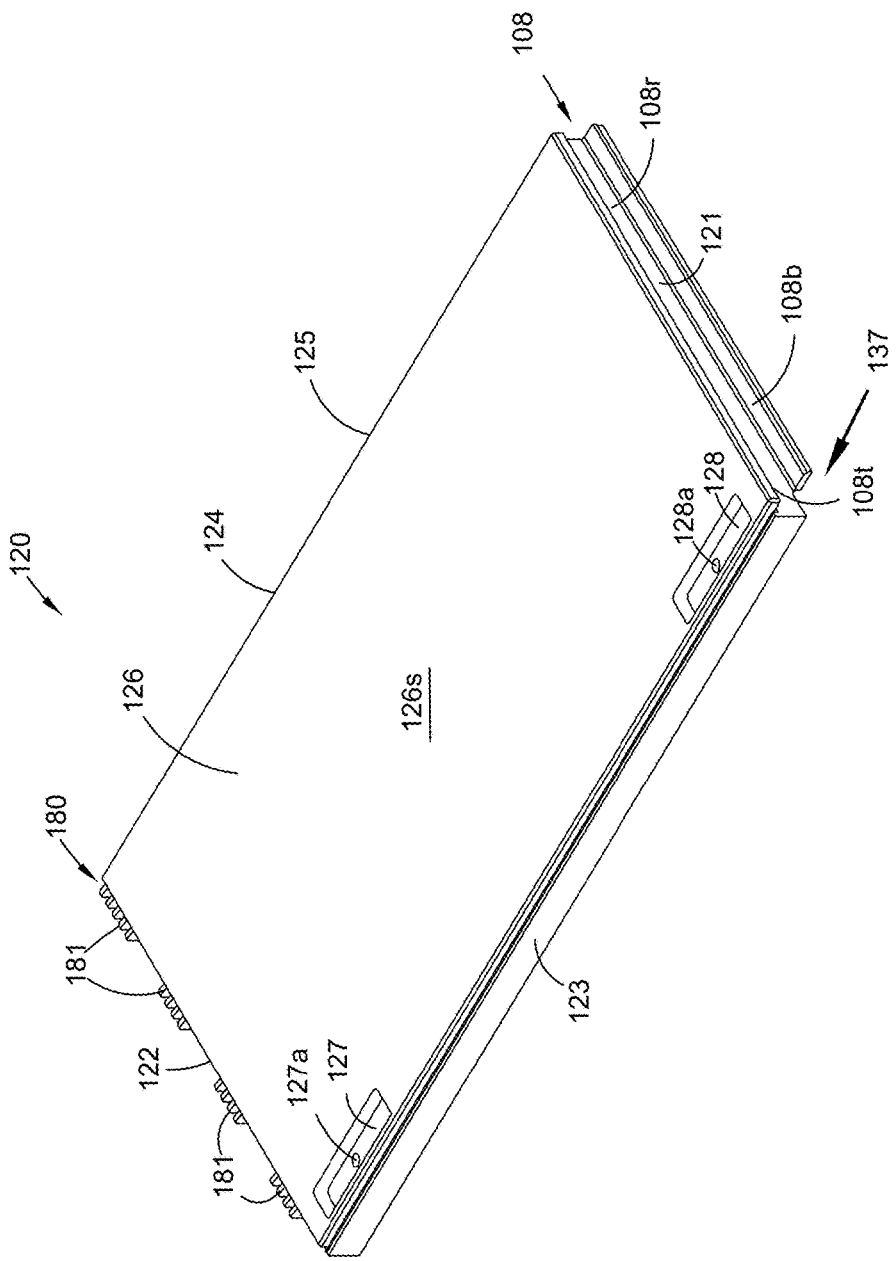
FIG. 4 is a perspective view of the illustrated embodiment module used in construction of the transit platform of FIG. 1.
Figure 5:
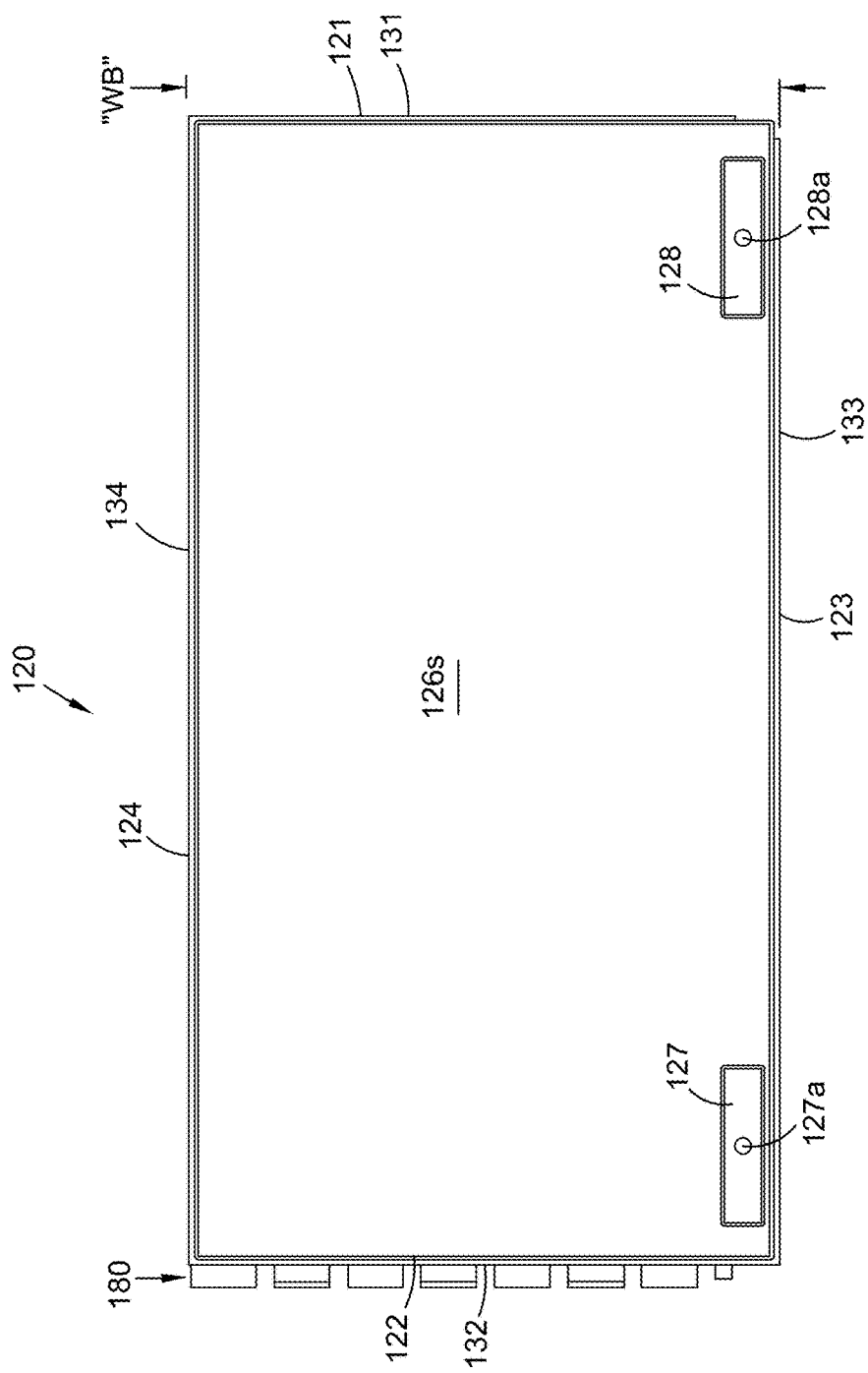
FIG. 5 is a top plan view of the illustrated embodiment module of FIG. 4.
Figure 6:
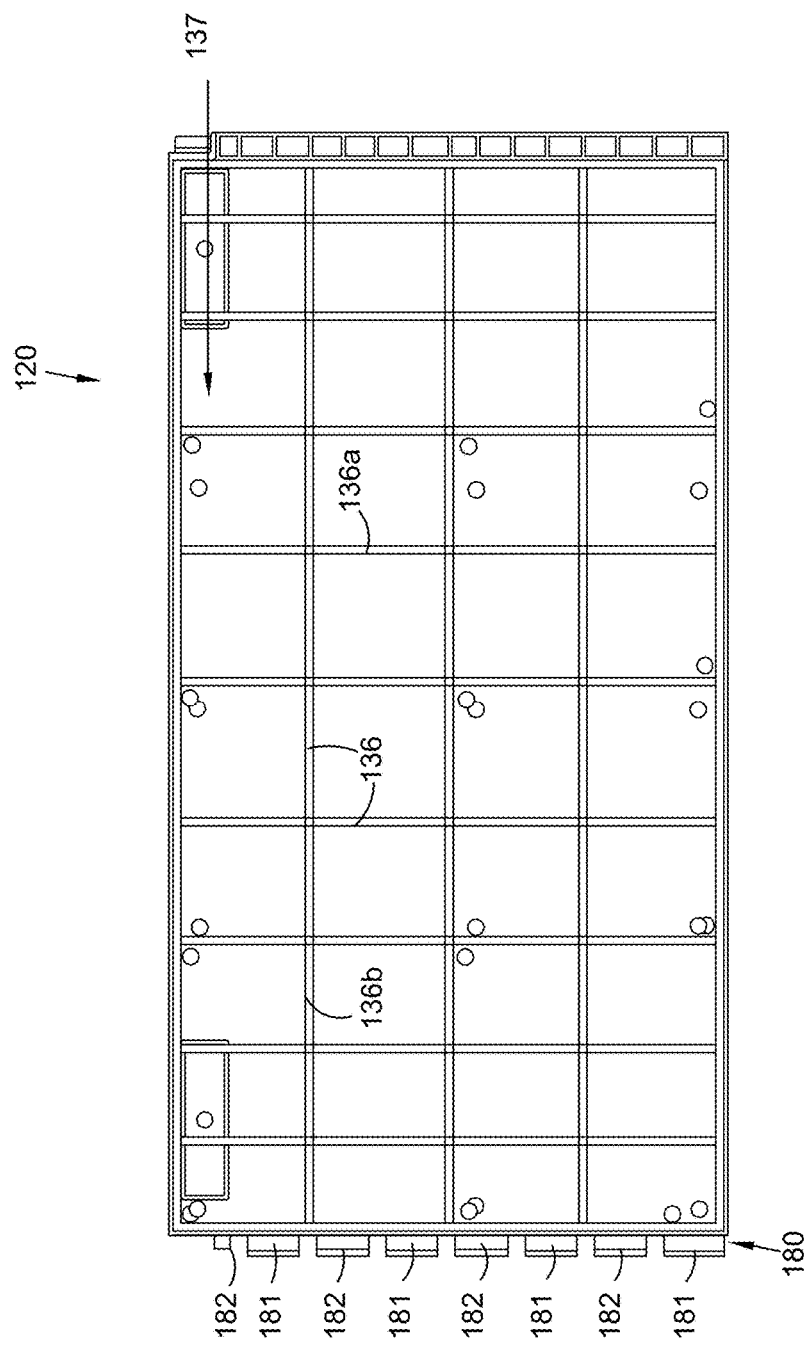
FIG. 6 is a bottom plan view of the illustrated embodiment module of FIG. 4.
Figure 7:
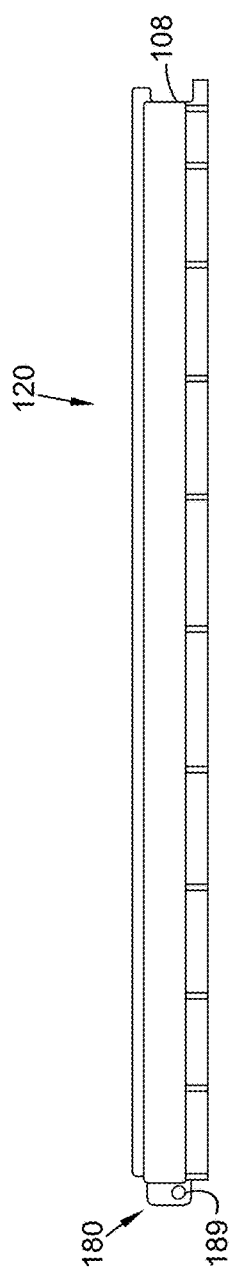
FIG. 7 is a left side elevational view of the illustrated embodiment module of FIG. 4.
Figure 8:
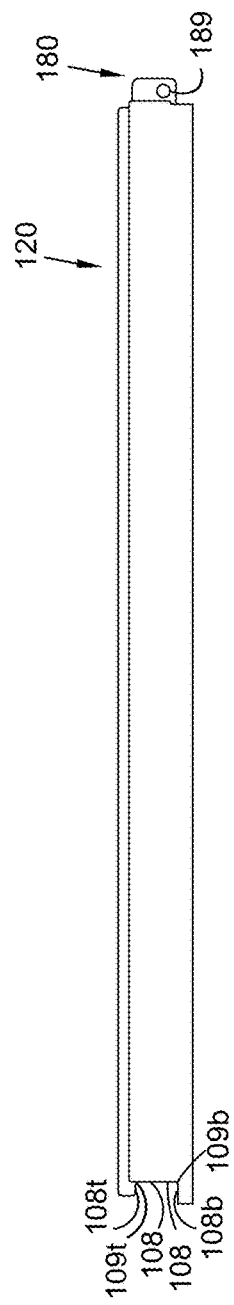
FIG. 8 is a right side elevational view of the illustrated embodiment module of FIG. 4.
Figure 9:
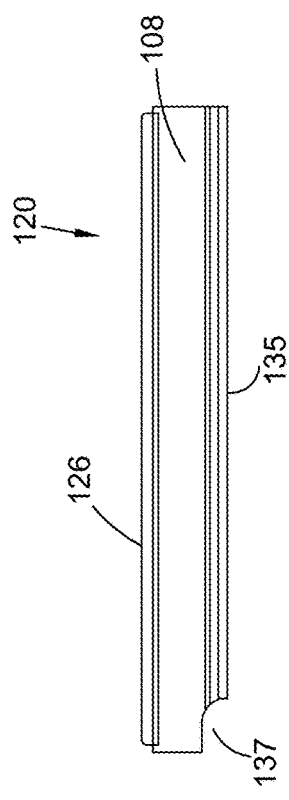
FIG. 9 is a left end elevational view of the illustrated embodiment module of FIG. 4.
Figure 10:
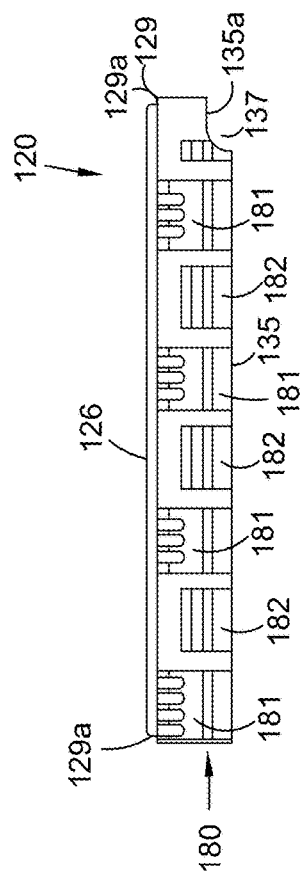
FIG. 10 is a right end elevational view of the illustrated embodiment module of FIG. 4.
Figure 11:
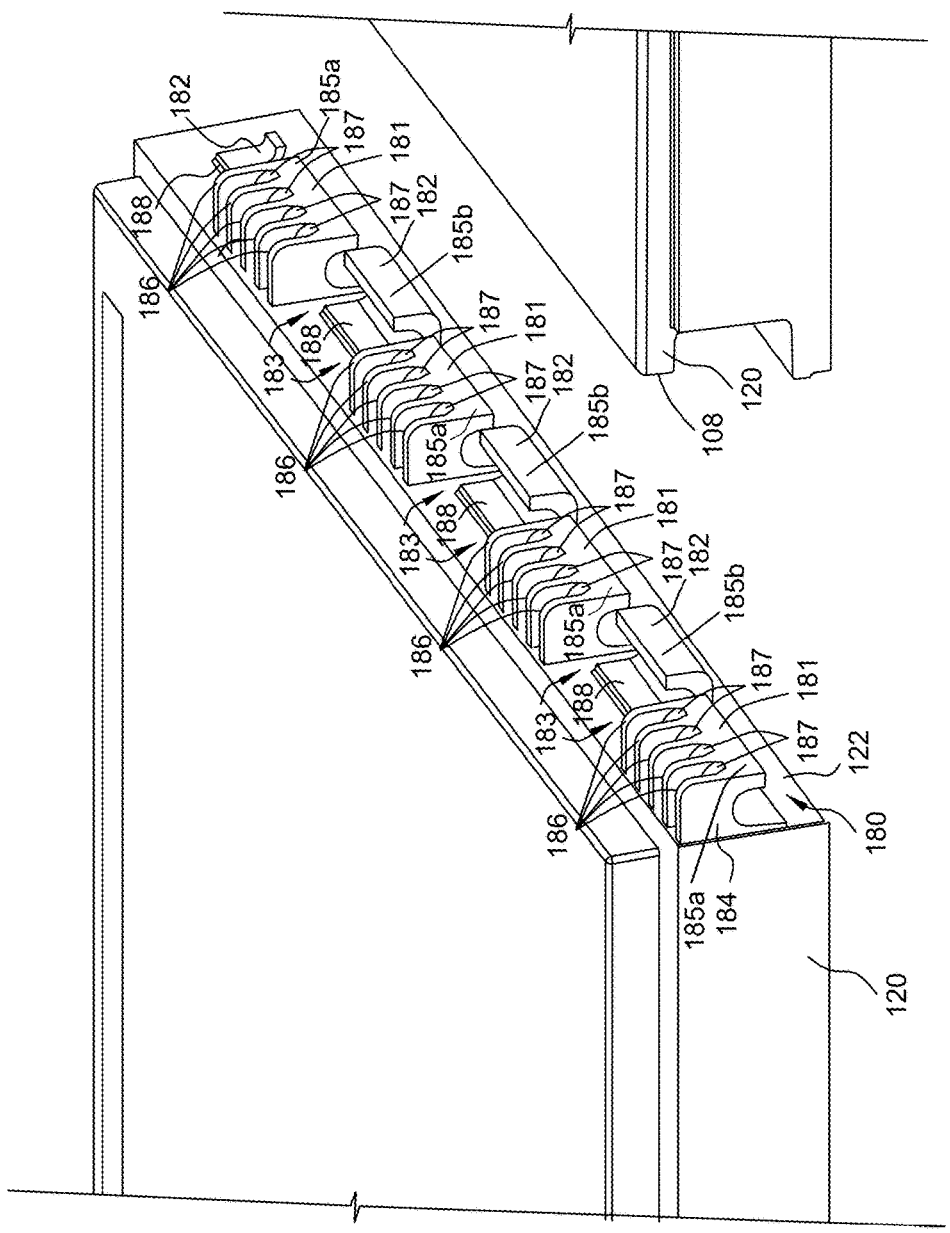
FIG. 11 is a perspective view from above of the tongue structure of the illustrated embodiment module of FIG. 4, with the top plate removed for the sake of clarity, and with two modules about to be connected together.
Figure 12:
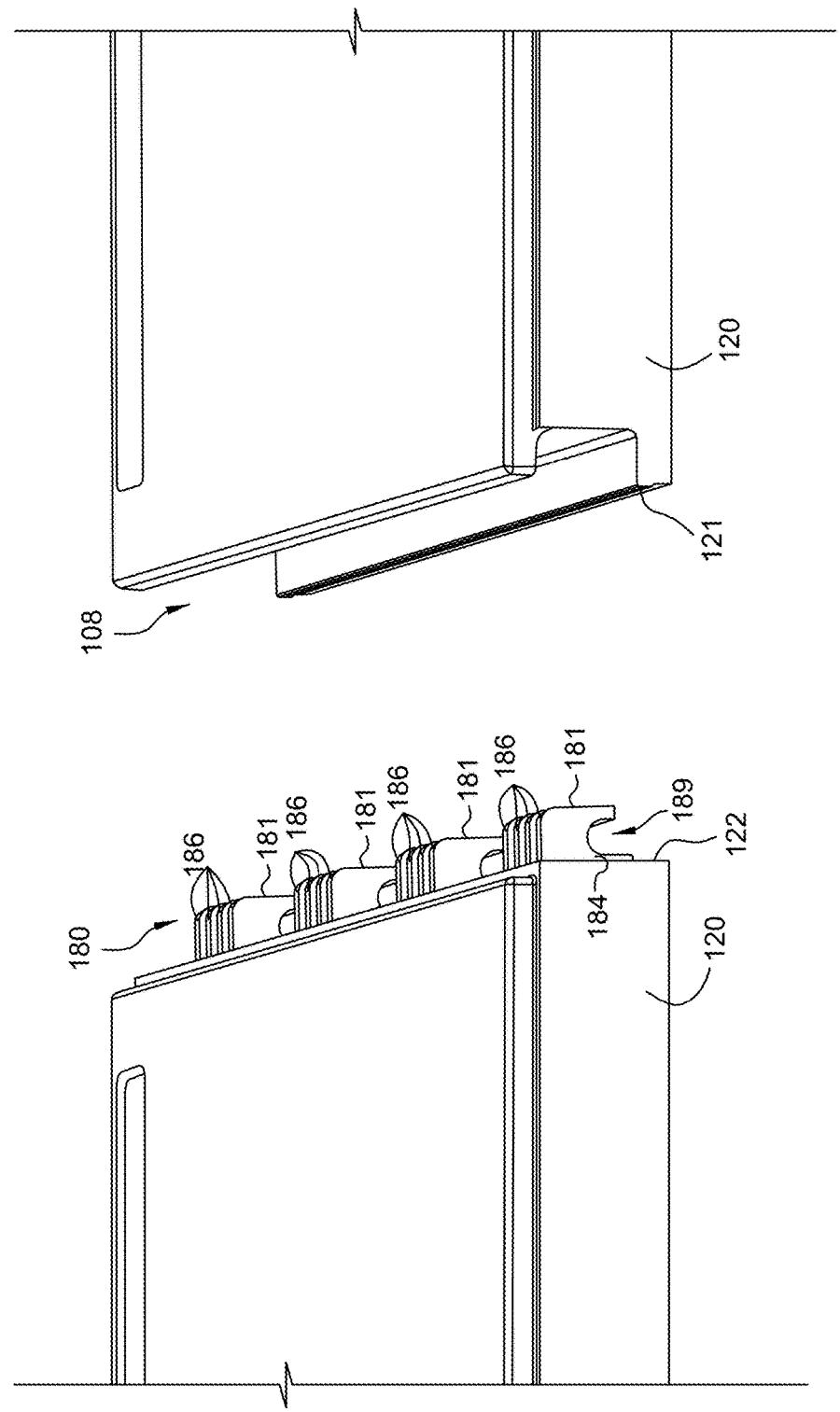
FIG. 12 is a perspective view from above and the side of the tongue structure of the illustrated embodiment module of FIG. 4, with the top plate removed for the sake of clarity, and with two modules about to be connected together.
Figure 13:
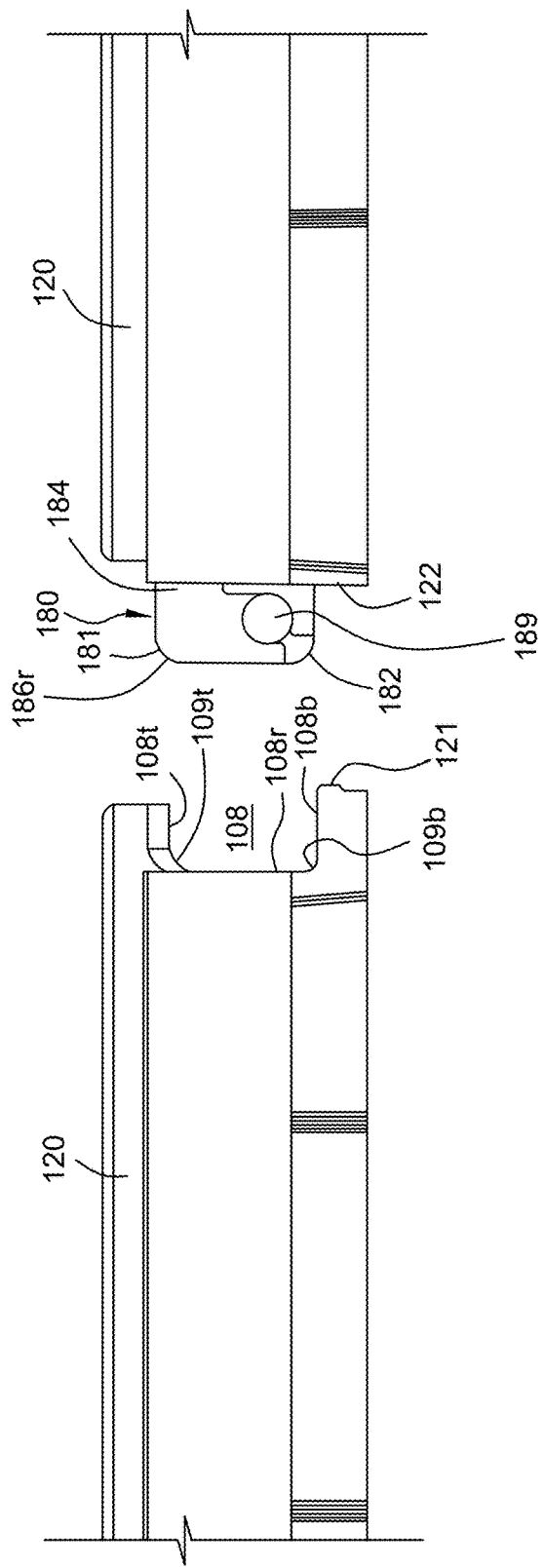
FIG. 13 is a side elevational view of the tongue structure of the illustrated embodiment module of FIG. 4, with the top plate removed for the sake of clarity, and with two modules about to be connected together.
Figure 14:
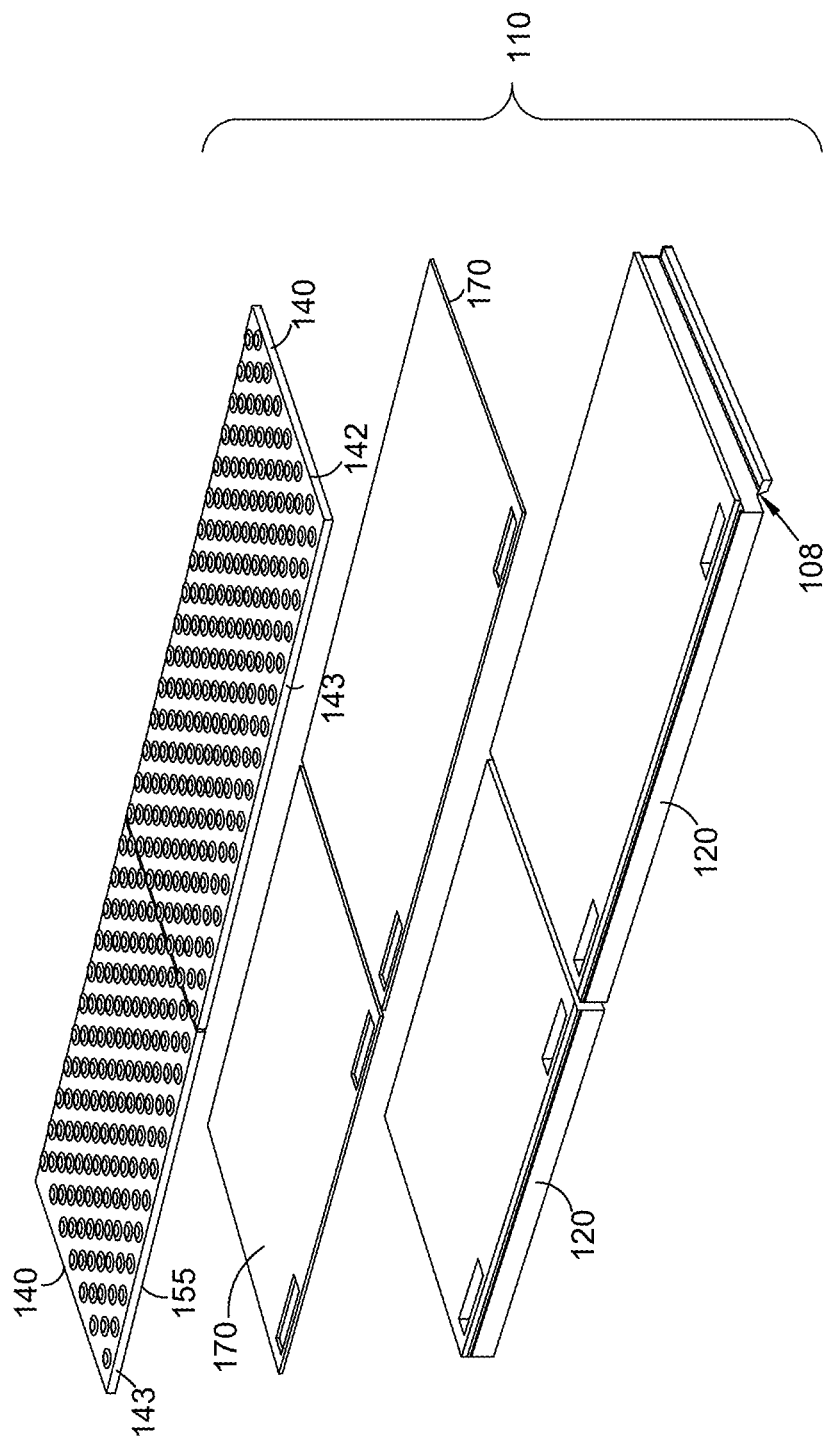
FIG. 14 is an exploded perspective view from above of the illustrated embodiment module of FIG. 4.
Figure 15:
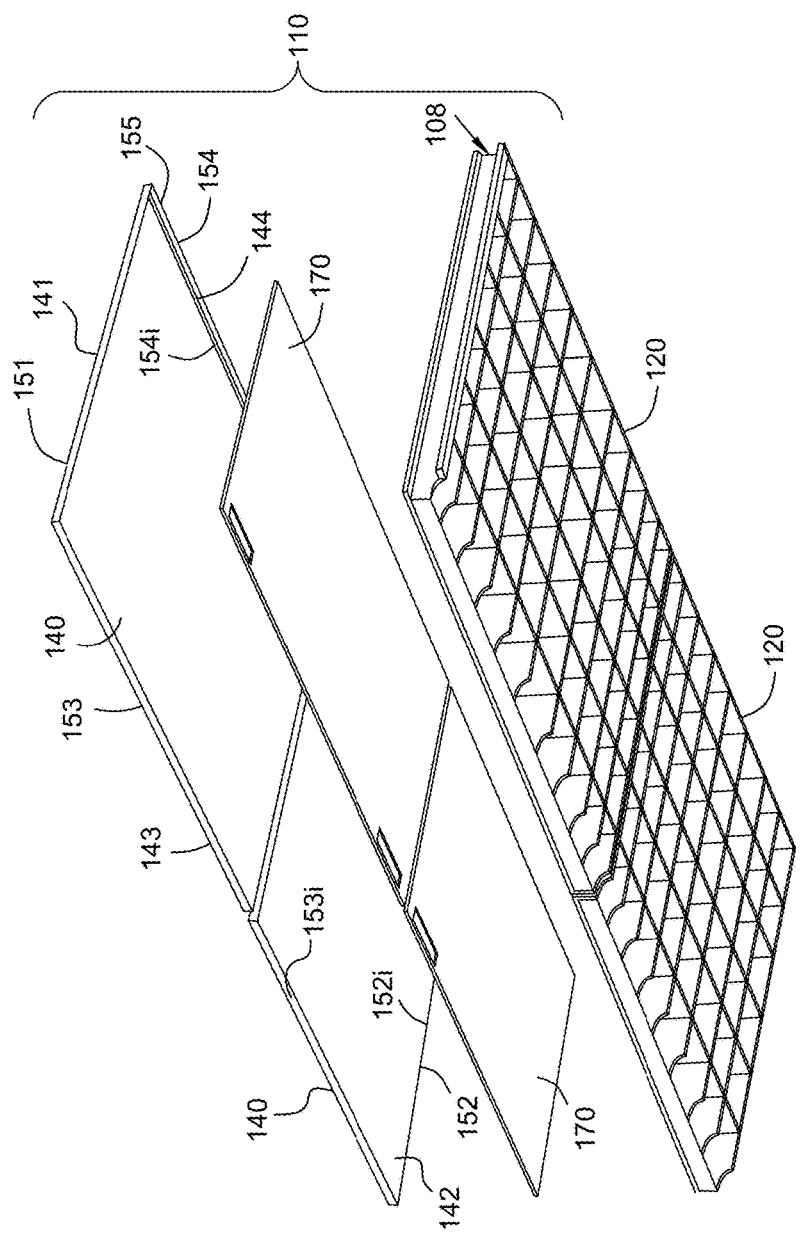
FIG. 15 is an exploded perspective view from below of the illustrated embodiment module of FIG. 4.
Figure 16:
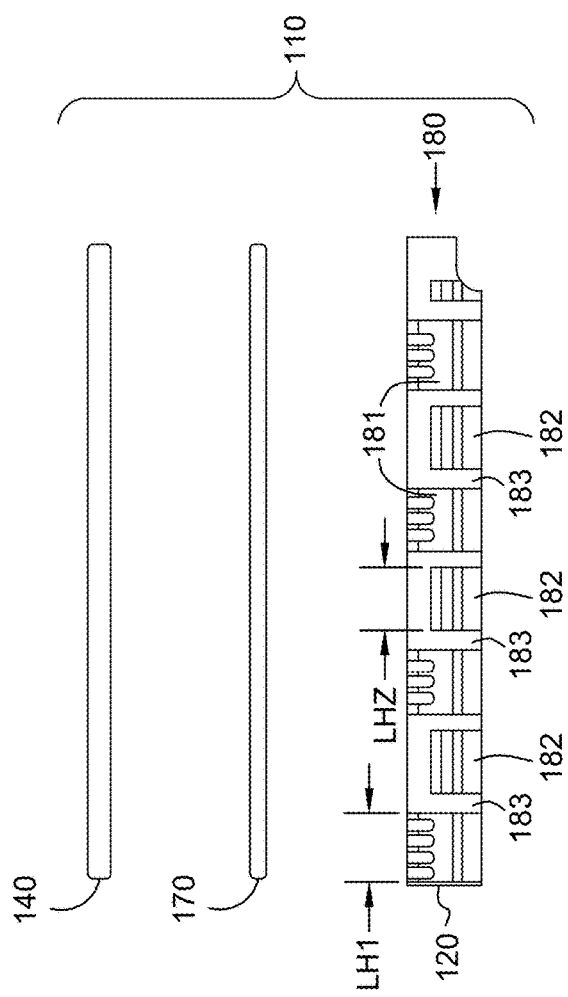
FIG. 16 is an exploded end elevational view of the illustrated embodiment module of FIG. 4.
Figure 17:
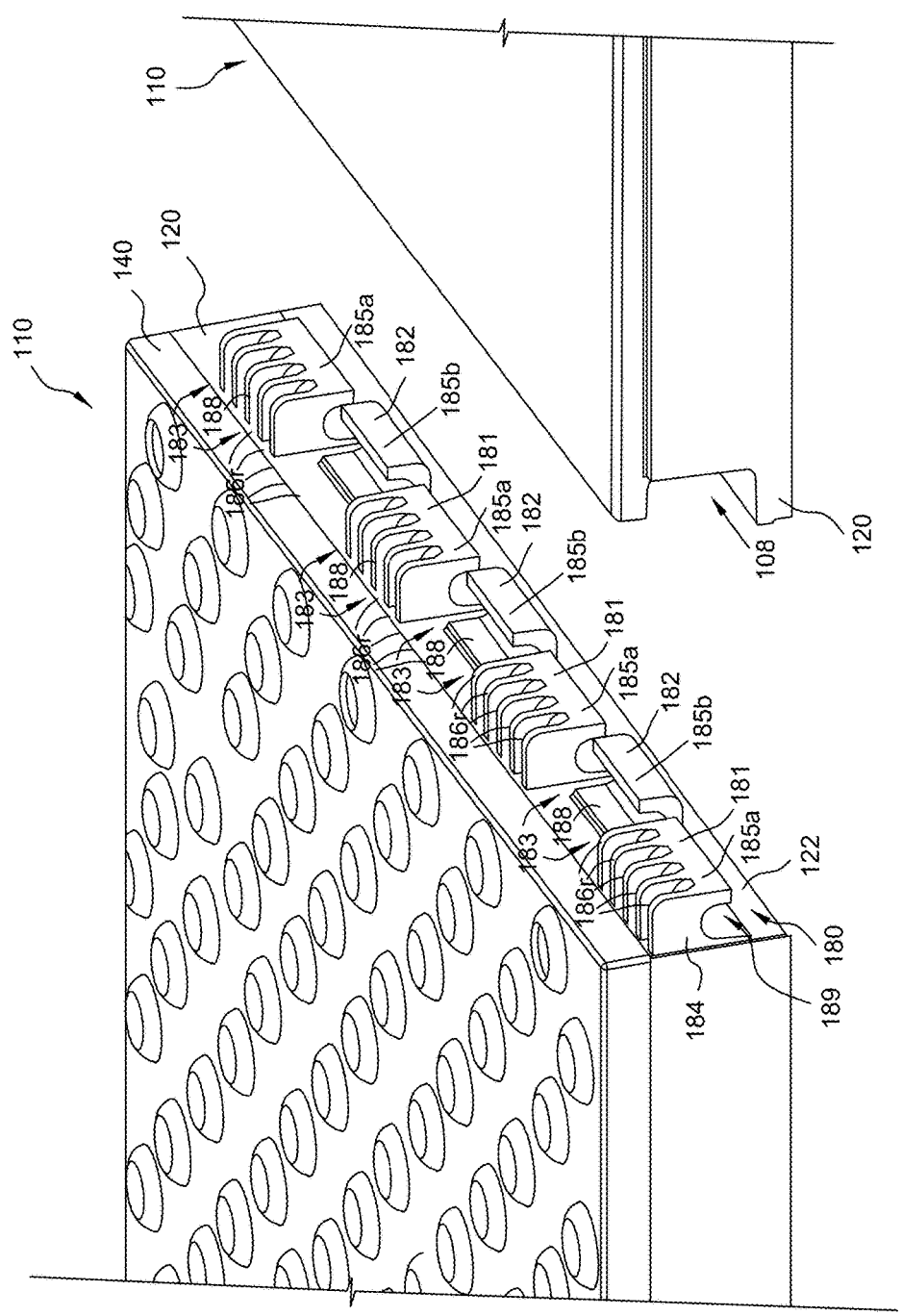
FIG. 17 is a perspective view from above of the tongue structure of the illustrated embodiment module of FIG. 4, with two modules about to be connected together.
Figure 18:
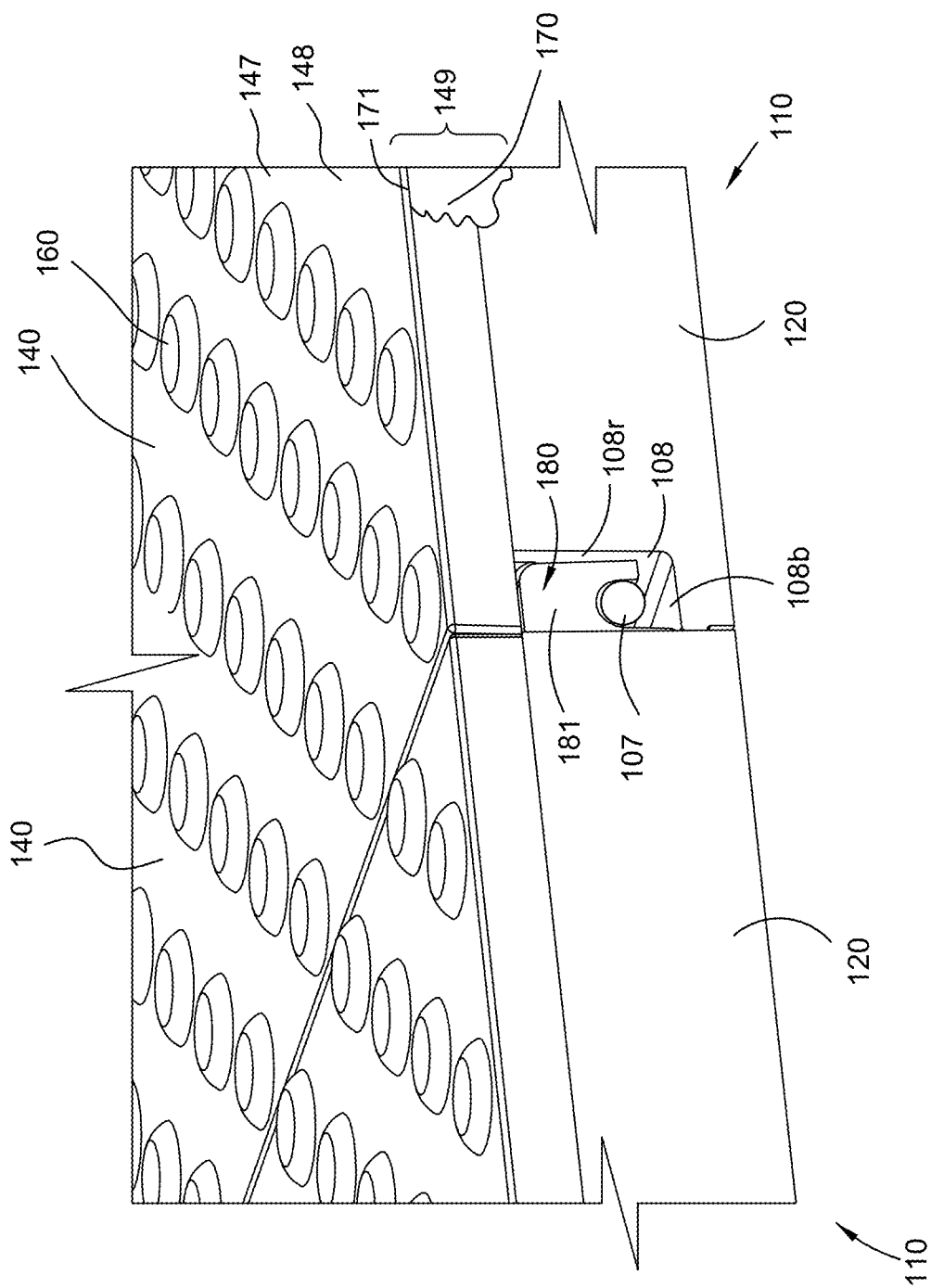
FIG. 18 is a perspective view from above of the tongue structure of the illustrated embodiment module of FIG. 4, with two modules connected together.
Figure 19:
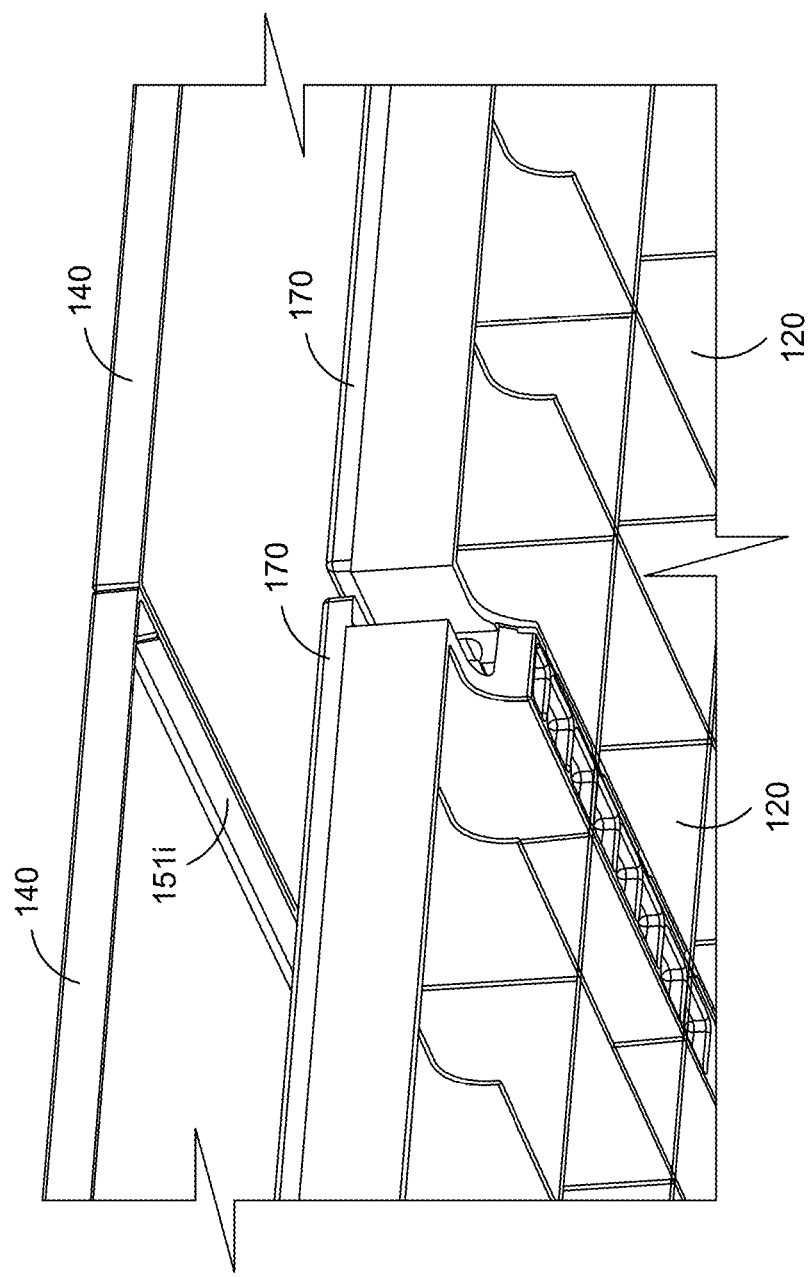
FIG. 19 is a perspective view from below of the tongue structure of the illustrated embodiment module of FIG. 4, with two modules connected together; and, FIG. 20 is a bottom plan view of two illustrated embodiment modules used in the construction of the transit platform of FIG. 1, connected together.
Figure 20:
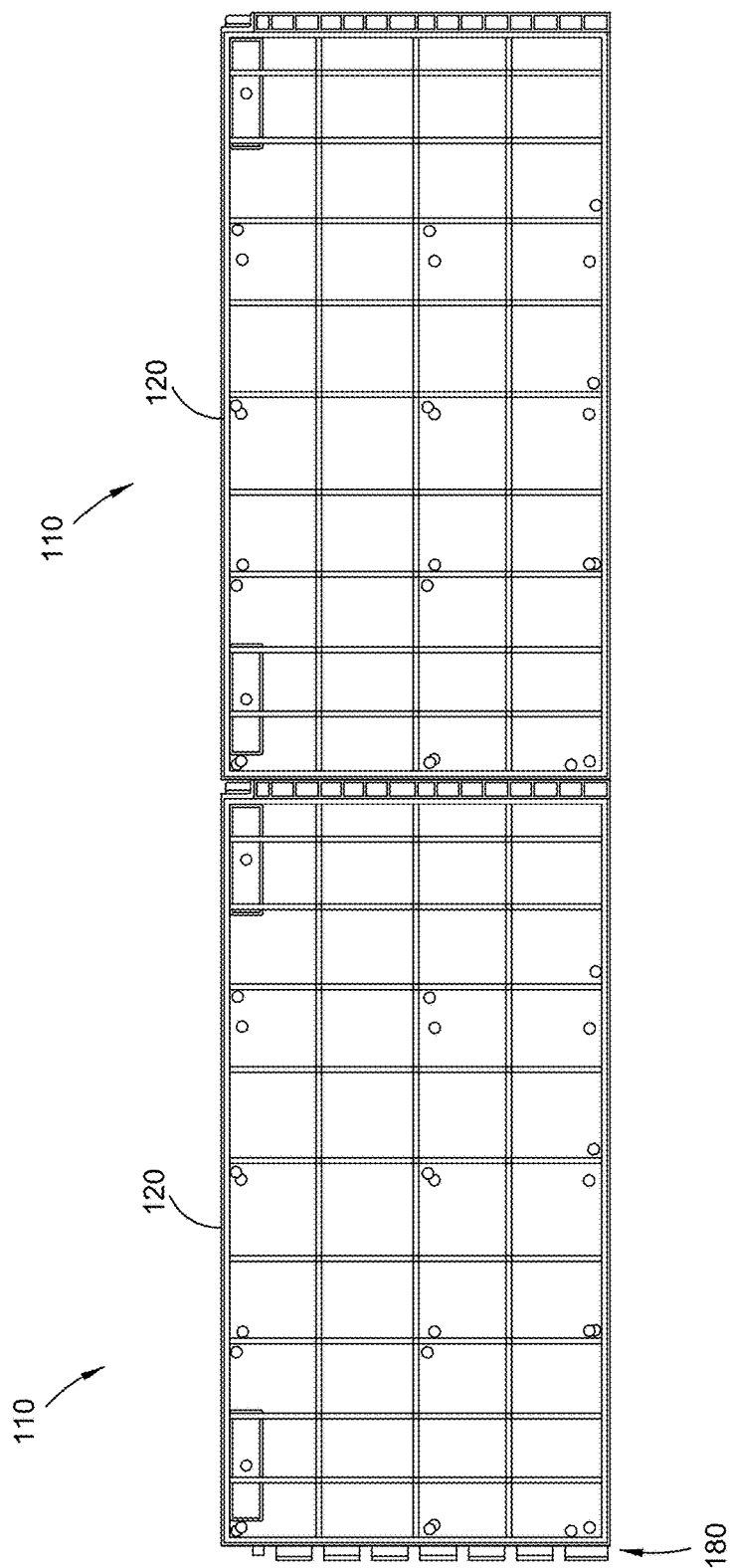

As can be best seen in FIGS. 1 and 3, the present invention, the pathway for traffic 100, and more specifically the transit platform 100, comprises a first modular panel 110a, a second modular panel 110b, a third modular panel 110c, a fourth modular panel 110d, and a fifth modular panel 110e.

More specifically, the illustrated embodiment module 110 comprises a modular panel 110 that is rectangular in shape, and is typically greater than one meter in length and less than one meter in width, and perhaps about 7.5 centimeters (3 inches) in height. It has been found that this size and shape is suitable for the intended applications. It should be understood that the modular panel 110 can be of any suitable shape and size.

As can be best seen in FIG. 3, the transit platform 100 comprises a first header wall 102 and a second header wall 104 disposed in parallel spaced relation one to the other, and with aligned bore holes 102a, 104a in the first header wall 102 and the second header wall 104, respectively. An elongate threaded securing rod 107 extends through the first header wall 102, the modular panel 110, and the second header wall 104, as will be discussed in greater detail subsequently. In general, the modular panels 110 are each installed in place to form the transit platform 100. The modular panels 110 may be installed in connected relation one to the next, or may be installed apart from one another, to form separate but related sections or areas of an overall transit platform. In the illustrated embodiment, the modular panels 110 are placed in first-end to second-end relation and are placed in first-side to second-side relation between the first header wall 102 and a second header wall 104 such that the first side walls 133 of the modular panels 110 face the first header wall 102 and the second side walls 134 of the modular panels 110 face the second header wall 104.

Each modular panel comprises a top plate 140 over a base member 120. In the illustrated embodiment, the electrically powered heater member 170 is disposed between the top plate 140 and the base member 120.

As illustrated, the module 110, and more specifically the modular panel 110, comprises a base member 120 for engaging the ground on which the modular panel 110 rests, the top plate 140 that is positioned generally over the base member 120, and an optional electrically powerable heater member 170, a threaded securing rod 107, a lateral groove 108 and a tongue structure 180, as will be discussed in greater detail subsequently.

More specifically, the base member 120 has a first end 121, a second end 122, a first side 123, a second side 124, a perimeter edge 125, and a top deck 126, and a top surface 126s. The top deck 126 extends between the first end 121, the second end 122, the first side 123 and the second side 124 of the base member 120, and preferably is generally continuous across the top of the base member 120. The top deck 126 of the base member 120 has a first recessed pocket 127 and a second recessed pocket 128 for accommodating electrical connectors and electrical wires therein. The first recessed pocket 127 has a wire-receiving aperture 127a therein and the second recessed pocket 128 has a wire-receiving aperture 128a therein for receiving electrical wires therethrough.

The base member 120 also has a first end wall 131 depending from the top deck 126 at the first end 121 thereof, a second end wall 132 depending from the top deck 126 at the second end 122 thereof, a first side wall 133 depending from the top deck 126 at the first side 123 thereof, and a second side wall 134 depending from the top deck 126 at the second side 124 thereof. The first end wall 131, the second end wall 132, the first side wall 133 and the second side wall 134 each terminate in a bottom edge that together form the bottom peripheral edge 135 of the base member 120. Preferably, and in the illustrated embodiment, the portion of the bottom peripheral edge 135 of the base member 120 defined by the second side wall 134, most of the first end wall 131 and most of the second end wall 132 is substantially planar in order to properly engage a receiving surface, such as a compacted gravel surface, or the like. The first end wall 131, the second end wall 132, the first side wall 133 and the second side wall 134 are each interconnected one to the next to help form a solid stable structure.

The base member 120 further comprises a plurality of internal cross support members 136 depending from the top plate 140. The internal cross support members 136 depend from the top deck 126 and extend to the bottom edge 135 of the base member 120, and comprise a plurality of lateral ribs 136a and a plurality of longitudinal ribs 136b. As can readily be seen in the Figures, the lateral ribs 136a each extend between the first side wall 133 and the second side wall 134 and are spaced generally evenly apart one from the next along the length of the base member 120, between the first end wall 131 and the second end wall 132 of the base member 120. Similarly, the longitudinal ribs 136b each extend between the first end wall 131 and the second end wall 132 and are spaced generally evenly apart one from the next along the width of the base member 120, between the first side wall 133 and the second side wall 134 of the base member 120.

The base member 120 also has a longitudinal raceway 137 in the bottom thereof, along the first side of the base member 120, for receiving electrical wires therein. In order to form the raceway 137, the bottom edge 135a of the first side wall 133 is slightly higher up than the bottom edge 135 of the second end wall 132 and the bottom edge 135 of the first end wall 131 and the bottom edge 135 of the of the second side wall 134. The longitudinal raceway 137 preferably extends from the first end wall 131 to the second end wall 132. In this manner, electrical wires can run from one modular panel 110 to the next, as will be described in greater detail subsequently.

The base member 120, and more specifically the first end wall 131 of the base member 120, defines the lateral groove 108 disposed at the perimeter edge 125, and that, in the illustrated embodiment, but not necessarily, extends the entire width "WB" of the base member 120. The groove 108 is defined by a top surface 108t, a recessed surface 108r and a bottom surface 108b. The top surface 108t and the recessed surface 108r are connected together by a top concave curved surface 109t. Similarly, the bottom surface 108b and the recessed surface 108r are connected together by a bottom concave curved surface 109b. The ratio of the height of the lateral groove 108 to the height of the base member 120 is between about 0.5:1 and 0.6:1.

The base member 120, and more specifically the second end wall 132 of the base member 120, defines the tongue structure 180 disposed at the perimeter edge 125. The tongue structure 180 is shaped and dimensioned to be received in the lateral groove 108. More specifically, the tongue structure 180 of a first module is shaped and dimensioned to be received in the lateral groove 108 of a second module. To form the transit platform 100, the modular panels 110 are placed in perimeter-edge to perimeter-edge relation one to the next, and more specifically in first-end to second-end relation, and are secured together one to the next, with the tongue structure 180 of each modular panel 110 inserted into the lateral groove 108 of an adjacent modular panel 110.

The tongue structure 180 defines a throughpassage 189 for receiving the threaded securing rod 107 therethrough. The throughpassage 189 in the tongue structure 180 is closer to the bottom peripheral edge 135 of the base member 120 than to the top deck 126 of the base member 120 so that there is sufficient structural strength of material above any bore holes, such as bore holes 102a, 104a, so as to preclude failure of that portion of the first or second header walls 102, 104.

In the illustrated embodiment, the tongue structure 180 comprises a plurality of tongue portions 181,182 that each project outwardly from the second end wall 132 of the base member 120. The tongue portions 181,182 comprise, as aforesaid, a first type of tongue portion 181 and a second type of tongue portion 182. The first type of tongue portion 181 and a second type of tongue portion 182 are disposed in alternating relation generally along the length of the tongue structure 180, with horizontal gaps 183 therebetween. Generally along the length of the tongue structure 180, the first type of tongue portions are shaped in a first radius at the top outer surface thereof.

The first type of tongue portion 181 has a root portion 184 extending outwardly from the second end wall 132 and is disposed above the throughpassage 189, and a finger portion 185a extending downwardly from the root portion 184. The root portion 184 comprises a plurality of fins 186 separated one from the next by a notch 187. The plurality of fins 186 comprises four fins 186 on at least most of the first type of tongue portions 181. The fins 186 are generally vertically disposed, are generally parallel one to another, and are substantially the same thickness one as the others. Further, the fins 186 are substantially the same shape one as the others, and have a rounded top outer corner 186r that is the same radius as the top concave curved surface 109t of the groove 108. Accordingly, when two adjacent modular panels 110 that are connected together one to the next in first-end to second-end relation, the rounded top outer corner 186r of the fins 186 and the top concave curved surface 109t of the groove 108 permit ready angular movement between the two connected modular panels 110, and also permit vertical forces to be transmitted readily between the two connected modular panels 110.

Also, the notches 187 that separate the fins 186 are substantially the same width one as the others. As illustrated, but not necessarily, the ratio of the thickness "T" of the fins 186 to the width "W" of the notches 187 is between about 0.5:1 and about 1:1.

The second type of tongue portion 182 has a root portion 188 extending outwardly from the second end wall 132 and is disposed below the throughpassage 189, and a finger portion 185b extending upwardly from the root portion 188.

The first type of tongue portion 181 is substantially larger than the second type of tongue portion 182 in order to have sufficient strength to transfer the force of weight of pedestrians on the transit platform 100 to the threaded securing rod 107 without breaking. Also, the first type of tongue portion 181 has a first lateral width "LW1" and a second type of tongue portion 182 has a second lateral width "LW2". The first lateral width "LW1" of the first type of tongue portion 181 and the second lateral width "LW2" of the first type of tongue portion 181 are approximately the same one as the other. Further, the horizontal gaps 183 between the first type of tongue portion 181 and the second type of tongue portion 182 are approximately the same lateral width one as the others, and the ratio of the lateral width of the horizontal gaps 183 to the lateral width "LW1" of the first type of tongue portion 181 and the lateral width "LW2" second type of tongue portion 182 is between about 0.3:1 and about 0.4:1.

Generally along the length of the tongue structure 180, the first tongue portions 181 and second tongue portions tongue portions 182 have no vertical overlap one with the other. Accordingly, once the molding process is complete and the base member is formed, the top portion of the mold and the bottom portion of the mold can be separated one from the other without first moving a supplementary mold part. This is highly advantageous in the molding process can be done more quickly and the mold is less expensive to build, maintain and operate.

The tongue structure 180 and the lateral groove 108 are each shaped and dimensioned to provide vertical clearance between the tongue structure 180 and the lateral groove 108, in order to facilitate ready insertion of the tongue structure 180 into the groove 108. The vertical clearance between the tongue structure 180 and the lateral groove 108 is between about one and about five millimeters.

The top plate 140 has a first end 141, a second end 142, a first side 143 and a second side 144, a top surface 145 and a bottom surface 146. The top surface 145 of the top plate 140 is preferably a detectable warning surface. More specifically, the top plate 140 comprises a plurality of horizontally spaced button structures 160 projecting upwardly therefrom that together form the detectable warning surface. The button structures 160 include both solid button structures 160a integrally formed with the top plate 140 and fastener-receiving button structures 160b, as will be discussed in greater detail subsequently. Typically in use, these horizontally spaced button structures 160 are highly visible to sighted persons, and even more importantly, are engageable by walking canes, and the like of visually impaired persons, in order to provide a warning of the edge of a pedestrian walkway such as the transit platform 100. The button structures 160 will be discussed in greater detail subsequently.

The top plate 140 also has a first end flange 151 depending from the top plate 140 at the first end 141 thereof, a second end flange 152 depending from the top plate 140 at the second end 142 thereof, a first side flange 153 depending from the top plate 140 at the first side 143 thereof, a second side flange 154 depending from the top plate 140 at the second side 144 thereof.

The first end flange 151, the second end flange 152, the first side flange 153 and the second side flange 154 each terminate in a bottom edge that together form the bottom peripheral edge 155 of the top plate 140. In a co-operating manner, the base member 120 has a peripheral recess 129 at the top thereof for receiving at least the bottom portions of the first side flange 153, the second side flange 154, the first end flange 151, and the second end flange 152. The top plate 140 is thereby engageable with the top deck 126 of the base member 120. Preferably, and in the illustrated embodiment, the bottom peripheral edge 155 of the top plate 140 is substantially planar in order to properly engage the base member 120.

The modular panel 110 further comprises a gasket 156 disposed in sealing relation between the horizontally outwardly facing surface 129a of the peripheral recess 129 and the horizontally inwardly facing surfaces 151i, 152i, 153i, 154i of the first end flange 151, the second end flange 152, the first side flange 153, and the second side flange 154. The gasket 156 is preferably continuous around the entire peripheral recess 129 at the top of the base member 120 in order to provide a waterproof seal between the top plate 140 and the base member 120.

The top plate 140 is in removable and replaceable relation to the base member 120, specifically to the top deck 126 of the base member 120, once in place, by means of a plurality of threaded fasteners 159. Each fastener 159 extends through a fastener-receiving aperture 161 in a fastener-receiving button structure 160b and engages in securing relation the top deck 126 of the base member 120. As can be readily understood, the top plate 140 can be easily and quickly removed and replaced, desired.

For any threaded fasters 159 that extend through the heater member 170, and aperture (not specifically shown) is punched in the heater member 170 in order to accommodate threaded fastener 159. Insulating tape (not specifically shown) is used to ensure a waterproof connection.

As discussed previously, the top plate 140 comprises a plurality of horizontally spaced button structures 160 projecting upwardly therefrom. The button structures 160 comprise both solid button structures 160a integrally formed with the top plate 140 and fastener-receiving button structures 160b. The fastener-receiving button structures 160b comprise an upwardly projecting peripheral portion 162 and a depressed central portion 163 that are both integrally formed with the top plate 140. The fastener-receiving aperture 161 is disposed within the depressed central portion 163 and is surrounded by the depressed central portion 163. A grommet 159a receives the threaded fastener 159 and seats into the depressed central portion 163.

The fastener-receiving button structure 160b further comprises a cap member 164 securable in removable and replaceable relation within the depressed central portion 163 of the fastener-receiving button structures 160b. The cap member 164 has at least one key 164a, and preferably a plurality of keys 164a. Correspondingly, the each of the fastener-receiving button structures 160b has at least one keyway 164b therein, and preferably the same number of keyways 164b as keys 164a. The keyways are preferably, but not necessarily, in the top plate 140 between the depressed central portion 163 and the upwardly projecting peripheral portion 162. The keys 164a are received in cooperating keyways 164b in the top plate 140. The keys 164a and the keyways 164b together rotationally align the cap member 164 such that the traction-providing protrusions on its top surface align with the traction-providing protrusions on the top surface of the top plate 140.

As can be readily seen in the Figures, the solid button structures 160a have a textured top surface 160t, and the cap members 164 of the fastener-receiving button structures 160b have a textured top surface 165. The texture top surfaces 160t and 165 provide for excellent traction for pedestrians walking on the top plates 140.

As also can readily be seen in the Figures, that the top plate 140 is securable in overlying relation to the top surface 126s of the base member 120 or in other words to the top deck 126 of the base member 120, with a heater-receiving space 149 therebetween. The modular panel 110 also has the optional electrically powered heater member 170 disposed within the heater-receiving space 149 between the base member 120 and the top plate 140. In the illustrated embodiment, the electrically powered heater member 170 comprises a thin sheet type electrically powered heater member 170. As illustrated, the electrically powered heater member 170 is disposed against the bottom surface 146 of the top plate 140, so is the maximize the heat transfer thereto. Further, the electrically powered heater member 170 is secured to the bottom surface 146 of the top plate 140, and preferably is secured to the bottom surface 146 of the top plate 140 by a suitable adhesive 171.

The top plate 140 preferably comprises any suitable polymer plastic material or Fibre-Glass™ type material, and preferably includes a heat conductive polymer material 147 and a heat retentive polymer material 148. The heat conductive polymer material 147 allows for quick conduction of heat from the heater member 170 through the top plate 140 and to the top surface of the top plate 140, in order to permit quick melting of snow and ice. The heat retentive polymer material 148 serves to retain heat within the heater member 170 once the electrical power to the heater member 170 has been turned off, thereby allowing for a longer cycle time until electrical power needs to be applied again to retain sufficient heat to melt snow and ice. It is also possible to include small stones, or the like, in the polymer material in order to preclude wearing of the top plate 140. It should be noted that small stones, or the like, cannot be included if the top plate 140 is formed via a compression molding method where the resin is pumped into the mold. It should also be noted that typically, fillers such as the heat conductive polymer material 147 and the heat retentive polymer material 148 degrade the UV resistance of the resin used to form the top plate 140. Accordingly, a UV resistant coating can be sprayed on top of the top plate 140.

Further, a suitable type of insulation (not specifically shown in this embodiment, but shown in another embodiment), such as pre-molded insulation or foamed insulation, can be used to fill the open spaces of the base member 120, between the various internal cross support members 136. As can be readily understood, the insulation precludes heat from the heater member 170 from escaping downwardly through the base member 120, thereby allowing for more efficient heating of the top plate 140. The insulation can be either a low density type of foam or a high density type of foam such as a structural foam to provide additional structural support. Further, a ceramic layer (not specifically shown), can be placed between the top plate 140 and the base member 120.

In order to form the transit platform 100, the base members 120 of the modular panels 110 are placed in perimeter-edge to perimeter-edge relation one to the next, and more specifically in first-end to second-end relation, and are secured together one to the next. The heater members 170 are then placed over the top decks 126 of the base members 120, and the top plates 140 are placed over the heater members 170 and onto the top decks 126 of the base members 120. The top plates 140 and the heater members 170 are secured in place via the threaded fasteners 159 extending through said fastener-receiving apertures 161 of the top plates and securely engaged in the base members 120.

More specifically, the base member 120 of a first modular panel 110 is set in place on a receiving surface, such as a compacted gravel surface, or the like. The base member 120 of a second modular panel 110 is placed in first-end to second-end relation with base member 120 of the first modular panel 110 by inserting the tongue structure 180 of the base member 120 of the second modular panel 110 into the groove 108 of the base member 120 of the first modular panel 110. The base member 120 of a third modular panel 110 is placed in first-end to second-end relation with the base member 120 of the second modular panel 110 by inserting the tongue structure 180 of the base member 120 of the third modular panel 110 into the groove 108 of the base member 120 of the second modular panel 110. This process is completed until a lengthwise row of the necessary number of base members 120 are in place.

Alternatively, the base members 120 of the modular panels 110 could be joined together the opposite other way around by setting the base member 120 of a first modular panel 110 in place on a receiving surface, and introducing the base member 120 of the second modular panel 110 over the tongue structure 180 of the base member 120 of the first modular panel 110 such that the tongue structure 180 of the base member 120 of the first modular panel 110 is received in the groove 108 of the base member 120 of the second modular panel 110.

Similarly, base members 120 are placed in perimeter-edge to perimeter-edge relation one to the next, and more specifically in first-end to second-end relation immediately beside the lengthwise row of base members 120 in order to form a second lengthwise row of modular panels 110. The tongues of laterally adjacent base members 120 are longitudinally aligned to for a single throughpassage 189 for receiving an elongate threaded securing rod therethrough. The above-described process is repeated until all of the necessary base members 120 are in place. For the present transit platform 100, the lengthwise rows of modular panels 110 are closely fit between two parallel timber headers 102, 104 that form the first header wall 102 and the second header wall 104 of the transit platform 100. The first header wall 102 and a second header wall 104 are disposed in parallel spaced relation one to the other, and with aligned bore holes 102a, 104a in the first header wall 102 and the second header wall 104. It should be noted that the first header wall 102 and the second header wall 104 can be made of any other suitable material, or materials, such as concrete.

The threaded securing rod 107 is inserted in place in the transit platform 100 as follows. A first metal plate 105 having an aperture 105a is placed against the outer face of the first header wall 102 with the aperture 105a aligned with the aperture 102a in the first header wall 102. Similarly, a second metal plate 106 having an aperture 106a is placed against the outer face of the second header wall 104 with the aperture 106a aligned with the aperture 104a in the second header wall 104. The threaded securing rod 107 is inserted through the aperture 105a in the first metal plate 105, through the bore hole 102a in the first timber header 102, is then inserted through the throughpassage 189 defined by the aligned tongue structures 180, and through the bore hole 104a in the second timber header 104, and through the aperture 106a in the second metal plate 106. Co-operating threaded nuts 102b, 104b are then put in place onto the threaded securing rod 107 at each end thereof to engage against the first metal plate 105 and the second metal plate 106. The co-operating threaded nuts 102b, 104b are then appropriately tightened. Alternatively, the first metal plate 105 and the second metal plate 106 could each be an "L"-bracket of similar that secures to the ground 103 on which the modular panels 110 rest.

For two interconnected modular panels 110, the threaded securing rod 107 substantially precludes the tongue structure 180 of one modular panel 110 and the lateral groove 108 of the other modular panel 110 from shifting vertically with respect to each other. The threaded securing rod 107 substantially precludes the two interconnected modular panels 110 from shifting with respect to the first header wall 102 and a second header wall 104.

For the entire transit platform 100, there is a plurality of threaded securing rods 107, with each threaded securing rod 107 inserted through an aligned pair of said bore holes 102a, 104a in the first header wall 102 and a second header wall 104, respectively, though the aperture 105a,106a in the first metal plate 105 and the second metal plate 106, respectively, and through the aligned throughpassage 189 of the modular panel 110. In the event that there are side-by-side ones of the modular panels 110, the overall structure is secured in fundamentally the same manner, except that the threaded securing rods 107 extend through the aligned throughpassages 189 of side-by-side modular panels 110.

In general, the modular panels 110 are placed in first-end to second-end relation and are placed in first-side to second-side relation between the first header wall 102 and a second header wall 104 such that the first side walls 133 of the modular panels 110 face the first header wall 102 and the second side walls 134 of the modular panels 110 face the second header wall 104.

During the placement of the modular panels 110, the electrical wires that will provide power to the heater members 170 are placed so as to be received by the longitudinal raceway 137 in each base member 120. The electrical wires can run from one modular panel 110 to the next as the base members 120 are put in place. The electrical connectors and electrical wires are accommodated in the first recessed pocket 127 and the second recessed pocket 128 in the top deck 126 of the base member 120, where the connectors of each are located.

It should be noted that having rows of the modular panels 110, or even unmodular panels, all the way across and no asphalt, is better for constructability purposes because the heatable transit platform 100 can be constructed during poor weather conditions, thereby minimizing construction delays, and also constructed much more quickly on an overall basis, and at a lower cost that if asphalt areas are included.

In the manufacture of the present invention, it is possible to use at least two methods of compression molding to form the base member 120 and the top plate 140. The first method is referred to as sheet molded compound (SMC) wherein a resin is pumped into a mold. Any "parts" inside must be stationary and in the proper place. The second method is referred to as wet compression molding. It should be noted that with what compression molding, small stones or the like can be included in the resident in order to make the top plate 140 more resistant to wear. It should also be noted that with either of these two methods of manufacture as discussed above, it is believed that the manufacturing cycle time for making a top plate 140 or a base member 120 can be about two to three minutes in length, or even less, which is a significant improvement over the prior art.

As can be readily understood from the above description and from the accompanying drawings, the present invention provides provide modules, such as modular panels, modular tiles, and the like, for use in constructing a pathway for traffic, such as a transit platform or the like, wherein the modules are readily installable, wherein the modules are cost effective to install, wherein the top panels are readily removable and replaceable, wherein the modules are readily connectable one to the next, wherein the modules are readily securable one to the next, wherein the modules are readily connectable one to the next on a substrate surface of a non-constant grade, wherein the modules are readily securable one to the next on a substrate surface of a non-constant grade, wherein the modules are readily connectable one to the next so as to accommodate varying angles of end-to-end connections between modules, wherein the modules are readily securable one to the next so as to accommodate varying angles of end-to-end connections between modules, wherein the modules readily fit properly in place adjacent a wood header of an adjoining platform subgrade that accommodates modules that are about three inches in height, wherein the modules include detectable warning indicators, wherein the modules include textured top surface, wherein the modules are water-resistant, wherein the modules are lightweight, wherein the amount of material used to form the modules is significantly less than in the prior art, wherein the amount of material used to form the internal support members of the modules is significantly less than in the prior art, wherein the modules are easier to manufacture than are prior art modules, wherein the modules are quicker to manufacture than are prior art modules, wherein the base member of the modules can be made via a compression molding process or method, such as sheet molded compound (SMC) or wet compression molding, all of which features are unknown in the prior art.

Other variations of the above principles will be apparent to those who are knowledgeable in the field of the invention, and such variations are considered to be within the scope of the present invention. Further, other modifications and alterations may be used in the design and manufacture of the modular panel, of the present invention, without departing from the spirit and scope of the accompanying claims.

Other variations are within the spirit of the present invention. Thus, while the invention is susceptible to various• modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as", "for example") provided herein, is intended merely to better illuminate embodiments of the invention and does not pose a limitation on the scope of the invention unless otherwise claimed. No language in the specification should be construed as indicating any non-claimed element as essential to the practice of the invention.

Illustrated embodiments of this invention are described herein. Variations of those illustrated embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A module for use in constructing a pathway for traffic, said module comprising:
    a base member having a first end, a second end, a first side and a second side, a perimeter edge and a top surface;
    wherein said base member defines a lateral groove disposed at said perimeter edge and extending along said first end, and a tongue structure disposed at said perimeter edge and extending along said second end;
    wherein said tongue structure is shaped and dimensioned to be received in said lateral groove;
    wherein said tongue structure comprises a plurality of tongue portions, and including a first type of tongue portion and a second type of tongue portion disposed in alternating relation along the length of said tongue structure, to thereby define a throughpassage for receiving a securing rod therethrough;
    wherein, along the length of said tongue structure, said first and second tongue portions have no vertical overlap one with the other; and,
    wherein, to form a pathway for traffic, said modules are placed in perimeter-edge to perimeter-edge relation one to the next, with the tongue structure of said modules inserted into said lateral groove of an adjacent module, and are secured together by said securing rod disposed through said throughpassage.

2. The module of claim 1, wherein said module comprises a modular panel.

3. The module of claim 1, wherein, to form a pathway for traffic, said modules are secured together one to the next.

4. The module of claim 1, wherein said first type of tongue portion has a root portion extending outwardly from said second end wall above said throughpassage and wherein said second type of tongue portion has a root portion extending outwardly from said second end wall below said throughpassage.

5. The module of claim 4, wherein said first type of tongue portion and said second type of tongue portion have horizontal gaps therebetween.

6. The module of claim 1, wherein said first type of tongue portion has a finger portion extending downwardly from said root portion.

7. The module of claim 1, wherein said root portion comprises a plurality of fins separated one from the next by a notch.

8. The module of claim 7, wherein said plurality of fins comprises four fins on at least most of said first type of tongue portion.

9. The module of claim 8, wherein said fins are generally vertically disposed.

10. The module of claim 9, wherein said fins are generally parallel one to another.

11. The module of claim 10, wherein said fins are substantially the same thickness one as the others.

12. The module of claim 11, wherein said notches are substantially the same width one as the others.

13. The module of claim 12, wherein said fins are substantially the same shape one as the others.

14. The module of claim 13, wherein the ratio of the thickness of said fins to the width of said notches is between about 0.5:1 and about 1:1.

15. The module of claim 14, wherein said fins each have a rounded top outer corner.

16. The module of claim 15, wherein said second type of tongue portion has and a finger portion extending upwardly from said root portion.

17. The module of claim 1, wherein said first type of tongue portion has a first lateral width and a second type of tongue portion has a second lateral width, and wherein said first lateral width of said first type of tongue portion and said second lateral width of said first type of tongue portion are approximately the same one as the other.

18. The module of claim 17, wherein said gaps between said first type of tongue portion and said second type of tongue portion are approximately the same lateral width one as the others.

19. The module of claim 17, wherein the ratio of said lateral width of said gaps to the lateral width of said first type of tongue portion and said second type of tongue portion is between about 0.3:1 and about 0.4:1.

20. The module of claim 1, wherein said tongue structure and said lateral groove are each shaped and dimensioned to provide vertical clearance between said tongue structure and said lateral groove.

21. The module of claim 1, wherein said base member has a top deck, a first end wall, a second end wall, a first side wall and a second side wall, and wherein said first end wall, said second end wall, said first side wall and said second side wall each depend from said top deck.

22. The module of claim 21, wherein said first end wall of said base member defines said lateral groove, and wherein said second end wall defines said tongue structure shaped and dimensioned to be received in said lateral groove, and wherein, to form a pathway for traffic, said modules are placed in first-end to second-end relation with the tongue structure of said modules inserted into said lateral groove of an adjacent module.

23. The module of claim 1, wherein said plurality of tongue portions each project outwardly from said second end wall of said base member.

24. The module of claim 1, wherein said first end wall, said second end wall, said first side wall and said second side wall are each interconnected one to the next.

25. The module of claim 1, further comprising a top plate having a first end, a second end, a first side and a second side.

26. The module of claim 1, wherein said top plate has a first end flange depending from said top plate at said first end thereof, a second end flange depending from said top plate at said second end thereof, a first side flange depending from said top plate at said first side thereof, a second side flange depending from said top plate at said second side thereof.

27. The module of claim 26, wherein said base member has a peripheral recess at the top thereof for receiving at least the bottom portions of said first side flange, said second side flange, said first end flange, and said second end flange, and wherein said top plate is thereby engageable with said top deck of said base member.

28. A modular structure for use in constructing a pathway for traffic, said modular structure comprising:

a first module and a second module, with each module comprising:
a base member having a first end, a second end, a first side and a second side, a perimeter edge and a top surface;
wherein said base member defines a lateral groove disposed at said perimeter edge and extending along said first end, and a tongue structure disposed at said perimeter edge and extending along said second end;
wherein said tongue structure is shaped and dimensioned to be received in said lateral groove;
wherein said tongue structure comprises a plurality of tongue portions, and including a first type of tongue portion and a second type of tongue portion disposed in alternating relation along the length of said tongue structure, to thereby define a throughpassage for receiving a securing rod therethrough;
wherein along the length of said tongue structure said first and second tongue portions have no vertical overlap one with the other; and,
wherein, to form a pathway for traffic, said modules are placed in perimeter-edge to perimeter-edge relation one to the next, with the tongue structure of said modules inserted into said lateral groove of an adjacent module; and,
a plurality of threaded securing rods, each threaded securing rod inserted through aligned pairs of said bore holes in a first header wall and a second header wall, respectively, and through the aligned throughpassages of side-by-side ones of said modules.

29. A pathway for traffic comprising:
a first header wall and a second header wall disposed in parallel spaced relation one to the other, and with aligned bore holes in said first header wall and said second header wall;
a plurality of modules, each module having a base member, with each said base member having a first end, a second end, a first side and a second side, a perimeter edge and a top surface;
wherein said base member defines a lateral groove disposed at said perimeter edge and extending along said first end, and a tongue structure disposed at said perimeter edge and extending along said second end;
wherein said tongue structure is shaped and dimensioned to be received in said lateral groove;
wherein said tongue structure comprises a plurality of tongue portions, and including a first type of tongue portion and a second type of tongue portion disposed in alternating relation along the length of said tongue structure, to thereby define a throughpassage for receiving a securing rod therethrough;
wherein along the length of said tongue structure said first and second tongue portions have no vertical overlap one with the other; and,
wherein, to form a pathway for traffic, said modules are placed in perimeter-edge to perimeter-edge relation one to the next, with the tongue structure of said modules inserted into said lateral groove of an adjacent module; and,
a plurality of threaded securing rods, each threaded securing rod inserted through aligned pairs of said bore holes in said first header wall and a second header wall, respectively, and through the aligned throughpassages of side-by-side ones of said modules.

30. A module for use in constructing a pathway for traffic, said module comprising:
a base member having a first end, a second end, a first side and a second side, a perimeter edge and a top surface;

wherein said base member defines a lateral groove disposed at said perimeter edge and extending along said first end, and a tongue structure disposed at said perimeter edge and extending along said second end;

wherein said tongue structure of said first module is shaped and dimensioned to be received in said lateral groove of said second module;

wherein said tongue structure comprises a plurality of tongue portions, and including a first type of tongue portion and a second type of tongue portion disposed in alternating relation along the length of said tongue structure, to thereby define a throughpassage for receiving a securing rod therethrough;

wherein, along the length of said tongue structure, said first and second tongue portions have no vertical overlap one with the other; and, wherein, to form a pathway for traffic, said modules are placed in perimeter-edge to perimeter-edge relation one to the next, with the tongue structure of said modules inserted into said lateral groove of an adjacent module, and are secured together by said securing rod disposed through said throughpassage.

\* \* \* \* \*